(12) United States Patent
Hirayama

(10) Patent No.: US 8,581,893 B2
(45) Date of Patent: Nov. 12, 2013

(54) LIQUID CRYSTAL DISPLAY APPARATUS

(75) Inventor: Ryuichi Hirayama, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 995 days.

(21) Appl. No.: 12/643,999

(22) Filed: Dec. 21, 2009

(65) Prior Publication Data
US 2010/0156868 A1   Jun. 24, 2010

(30) Foreign Application Priority Data

Dec. 24, 2008   (JP) ................................ 2008-326807

(51) Int. Cl.
*G09G 5/00*     (2006.01)

(52) U.S. Cl.
USPC ........................................................ 345/208

(58) Field of Classification Search
None
See application file for complete search history.

(56) References Cited

U.S. PATENT DOCUMENTS

| | | | |
|---|---|---|---|
| 6,075,505 A | 6/2000 | Shiba et al. | |
| 2004/0196232 A1 | 10/2004 | Kim et al. | |
| 2005/0162362 A1* | 7/2005 | Takasugi et al. | 345/90 |
| 2005/0259059 A1* | 11/2005 | Park et al. | 345/89 |
| 2006/0290863 A1 | 12/2006 | HoeSup | |
| 2008/0068516 A1 | 3/2008 | Mori et al. | |
| 2008/0094388 A1* | 4/2008 | Yamazaki | 345/212 |
| 2009/0115737 A1* | 5/2009 | Toyoshima | 345/173 |
| 2009/0279007 A1* | 11/2009 | Shih et al. | 349/37 |

FOREIGN PATENT DOCUMENTS

| | | |
|---|---|---|
| CN | 1885140 A | 12/2006 |
| JP | 05-210115 A | 8/1993 |
| JP | 10-073843 A | 3/1998 |
| JP | 11-024045 A | 1/1999 |
| JP | 11-084417 A | 3/1999 |
| JP | 2004-185006 A | 7/2004 |
| JP | 20058-141262 A | 6/2005 |
| JP | 2007-249133 A | 9/2007 |
| JP | 2008-070763 A | 3/2008 |
| TW | 200420954 A | 10/2004 |

OTHER PUBLICATIONS

Chinese Office Action dated Nov. 24, 2011, in a counterpart Chinese Patent Application No. 200911000261.9.
Japanese Office Action in counterpart application JP2008-326807, dated on Nov. 16, 2010.

* cited by examiner

*Primary Examiner* — Adam R Giesy
*Assistant Examiner* — Henok Heyi
(74) *Attorney, Agent, or Firm* — Chen Yoshimura LLP

(57) ABSTRACT

A liquid crystal display apparatus includes a first group of pixel electrodes having a first parasitic capacitance, a second group of pixel electrodes having a second parasitic capacitance, a common electrode, liquid crystal interposed between the common electrode and the first and second groups of pixel electrodes, respectively, and a driver circuit determining a first common voltage in accordance with the first parasitic capacitance and supplying the first common voltage to the common electrode during a writing period of the first group of pixel electrodes so as to substantially offset a voltage drop in the second group of pixel electrodes due to the first parasitic capacitance, the driver circuit determining a second common voltage in accordance with the second parasitic capacitance and supplying the second common voltage to the common electrode during a writing period of the second group of pixel electrodes so as to substantially offset a voltage drop in the second group of pixel electrodes due to the second parasitic capacitance.

17 Claims, 20 Drawing Sheets

LIQUID CRYSTAL DISPLAY APPARATUS

CROSS-REFERENCE TO RELATED APPLICATIONS

This application is based upon and claims the benefit of priority from the prior Japanese Patent Application No. 2008-326807, filed Dec. 24, 2008, entire contents of which are hereby incorporated by reference.

BACKGROUND OF THE INVENTION

1. Field of the Invention

The invention relates to a liquid crystal display (LCD) apparatus.

2. Description of the Related Art

In recent years, active matrix type liquid crystal display (LCD) apparatus that employs a thin film transistor (TFT) as a switching element has been developed. On the display area of the active matrix type LCD apparatus, there are provided a plurality of pixels arranged in a matrix, a plurality of scanning lines for sequentially scanning the pixels row by row, and a plurality of data lines for providing data to be written onto the respective pixels. Each of the pixels is provided with a TFT, as a switching element, having a gate electrode connected to a scanning line and a drain electrode connected to a data line; a pixel electrode that is connected to a source electrode of the TFT; a common electrode that is set to a voltage common to all the pixels; and with a auxiliary capacitor for storing charges to maintain the voltage differential between the pixel electrode and the common electrode at a predetermined voltage differential. Here, between the pixel electrode and the common electrode, a liquid crystal, for example, whose orientational state changes in accordance with the voltage differential between the pixel electrode and the common electrode, is provided.

At the periphery of the display area, there are provided a gate driver that is connected to the scanning lines for scanning the TFTs (on/off control of the TFTs) via the scanning lines, and a data driver that is connected to the data lines for outputting a prescribed data voltage to each of the pixels (including the auxiliary capacitor and the liquid crystal, etc.) via the data lines.

The active matrix type LCD apparatus is frequently incorporated in small mobile devices, such as a mobile phone, a digital camera and the like, as a monitor. In this case, it is preferable to make as narrow as possible a frame that is formed at the peripheral parts of the display area. Thus, the gate driver and the source driver that occupy large areas are collectively formed at one of the sides of the frame. With this arrangement of the gate driver and the source driver, their mounting process can also be simplified. However, in such a case, due to their locations of the gate driver and the source driver, the scanning lines and/or the data lines need to be laid around the periphery of the display area (the frame) for a long distance. To reduce the area of the "laid-around" region, a connecting structure for the pixels, in which the number of scanning lines is doubly increased and the number of signal lines is reduced to half, has been devised.

FIG. 18 is a schematic diagram showing an exemplary connection for the pixels in the display screen, which is devised as a method for accomplishing such a narrow frame. This is to share one data line S(i) with the adjacent two pixels P (i, j). In this case, the TFTs that correspond to these two pixels P (i, j) are respectively connected to different scanning lines G (j).

For example, in FIG. 18, the TFT for the upper-left pixel P (1, 1) is connected to the scanning line G (1) and the data line S (1), and the TFT for the immediate right pixel P (1, 2) is connected to the scanning line G (2) and the data line S (1). The pixels P (1, 1) and P (1, 2) are arranged between the scanning line G (1) and the scanning line G (2).

FIG. 19 shows a scanning direction (the respective scanning signal waves) of the scanning lines G (j) when a video signal Vsig is written onto the pixels (i, j) in the foregoing active matrix type LCD apparatus, and also shows a writing sequence between the adjacent pixels P (i, j) that share the data lines S (i). For example, the pixels P (1, j) that are connected to the data line S (1) are written in the order of the pixels P (1, 1), P (1, 2), P (1, 3) and P (1, 4).

In the pixel connection for reducing the number of signal lines to half as described above, the pixels in each row—in particular, the pixels adjacently arranged in the row direction—are respectively connected to the scanning lines that are disposed on different sides relative to the pixels. Therefore, for example, as shown in FIG. 20, if there is a positional displacement (i.e., alignment error) in the locations of pixel electrodes in a direction perpendicular to the extending direction of the scanning lines, parasitic capacitances Cgs1, Cgs2, which are generated between the pixel electrodes and the scanning lines, take different values between the pixels that are disposed adjacent to each other in the extending direction of the scanning lines. In such a case, even when a display signal voltage of the same voltage level is written onto each of the pixels adjacently disposed in the extending direction of the scanning lines, as shown in FIG. 21, the respective level shift voltages $\Delta V1$, $\Delta V2$ that are generated upon the completion of writing the display signal voltage will be different between the adjacent pixels in the extending direction of the scanning lines, causing a problem of a reduction in image quality. FIG. 21 shows voltage changes at the pixels P (1, 1) and P (1, 2) of FIG. 20.

BRIEF SUMMARY OF THE INVENTION

The present invention has been devised in view of the above-described problems in the conventional art, and aims to provide an LCD apparatus, in which the reduction of image quality can be prevented, even when there occur positional displacements in the pixel electrodes in the direction perpendicular to the extending direction of the scanning lines, for example.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provide a liquid crystal display apparatus, including a liquid crystal display part and a driver circuit part, wherein the liquid crystal display part includes: a set of a first scanning line, a second scanning line and a data line, a first pixel electrode connected to the data line via a first switching element controlled by the first scanning line; a second pixel electrode connected to the data line via a second switching element controlled by the second scanning line; and a common electrode to apply voltages to liquid crystal that is disposed over the first electrode and the second electrode, respectively, wherein the first pixel electrode and the second pixel electrode are disposed between the first scanning line and the second scanning line, and the first pixel electrode and the second pixel electrode are written with corresponding display signal voltages in different writing periods, the display signal voltage taking two separate levels for each gray scale level, defining a central voltage of display signal voltages as a center of said two separate levels, and wherein the driver circuit part supplies common voltages to said common electrode such that a voltage differential between the common voltage supplied to the common electrode and said central voltage during a writing period of the first pixel electrode can be set to differ from a voltage differential between the common voltage supplied to the common electrode and said central voltage during a writing period of the second pixel electrode.

In another aspect, the present invention provides a liquid crystal display apparatus, including a first group of pixel electrodes having a first parasitic capacitance, a second group of pixel electrodes having a second parasitic capacitance, a common electrode, liquid crystal interposed between the common electrode and the first and second groups of pixel electrodes, respectively, and a driver circuit determining a first common voltage in accordance with the first parasitic capacitance and supplying the first common voltage to the common electrode during a writing period of the first group of pixel electrodes so as to substantially offset a voltage drop in the first group of pixel electrodes due to the first parasitic capacitance, the driver circuit determining a second common voltage in accordance with the second parasitic capacitance and supplying the second common voltage to the common electrode during a writing period of the second group of pixel electrodes so as to substantially offset a voltage drop in the second group of pixel electrodes due to the second parasitic capacitance.

In another aspect, the present invention provides a method for manufacturing a liquid crystal display apparatus, including preparing a liquid crystal device that includes a first group of pixel electrodes having a first parasitic capacitance, a second group of pixel electrodes having a second parasitic capacitance, a common electrode, liquid crystal interposed between the common electrode and the first and second groups of pixel electrodes, respectively, a driver circuit that supplies a common voltage to the common electrode, and a memory for storing information relating to said first and second parasitic capacitances; acquiring information relating to said first and second parasitic capacitances; storing the information relating to said first and second parasitic capacitances in said memory; and programming said driver circuit such that, based on the information stored in said memory, the driver circuit determines a first common voltage and supplies the first common voltage to the common electrode during a writing period of the first group of pixel electrodes so as to substantially offset a voltage drop in the first group of pixel electrodes due to the first parasitic capacitance, and such that, based on the information stored in said memory, the driver circuit determines a second common voltage and supplying the second common voltage to the common electrode during a writing period of the second group of pixel electrodes so as to substantially offset a voltage drop in the second group of pixel electrodes due to the second parasitic capacitance.

According to these aspects of the present invention, among other advantages, even when there occur positional displacements in the pixel electrodes in the directional perpendicular to an extending direction of the scanning lines, reduction of image quality can be prevented.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Exemplary embodiments for implementing the present invention will now be described with reference to the figures. In the exemplary embodiments, cases where driving voltages for each LCD apparatus are adjusted by the data prescribed and stored in accordance with the finished condition of the LCD apparatus are explained as an example.

Figure 1:
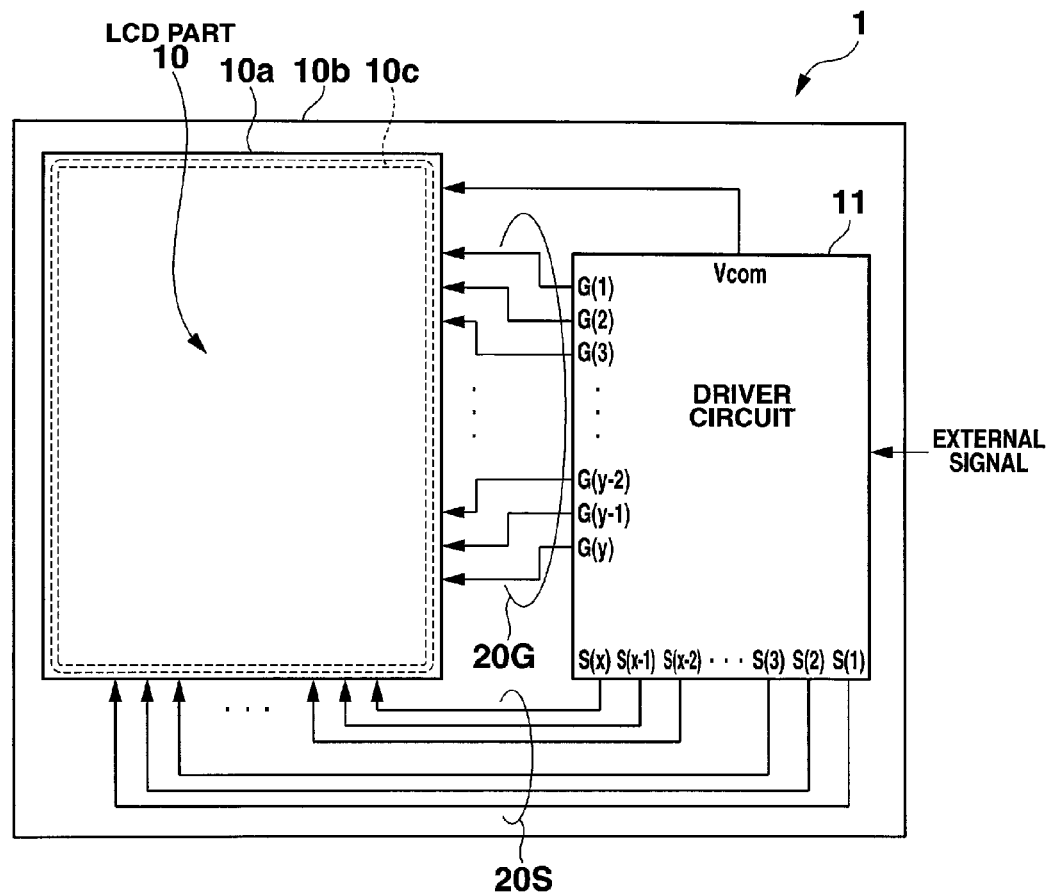
FIG. 1 is a schematic top view showing an LCD apparatus in accordance with an embodiment of the invention.
Figure 2:
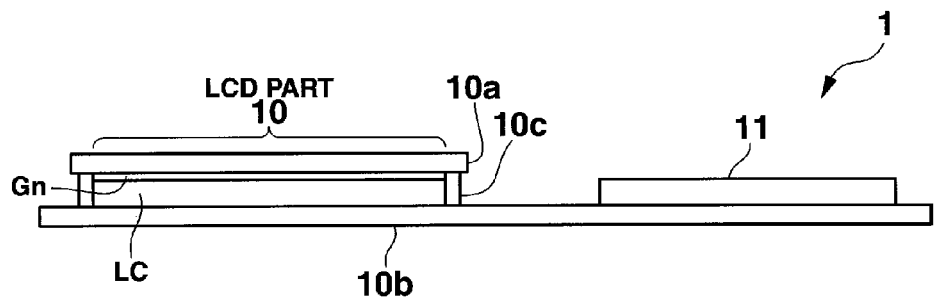
FIG. 2 is a schematic cross-section view showing a LCD apparatus according to an embodiment of the invention.

As shown in FIGS. 1 and 2, an LCD apparatus 1 in accordance with embodiments of the present invention is composed of an LCD part 10 that arranges a plurality of pixels, which will be described later, and a driver circuit 11 that controls each of the pixels in the LCD part 10.

Figure 3:
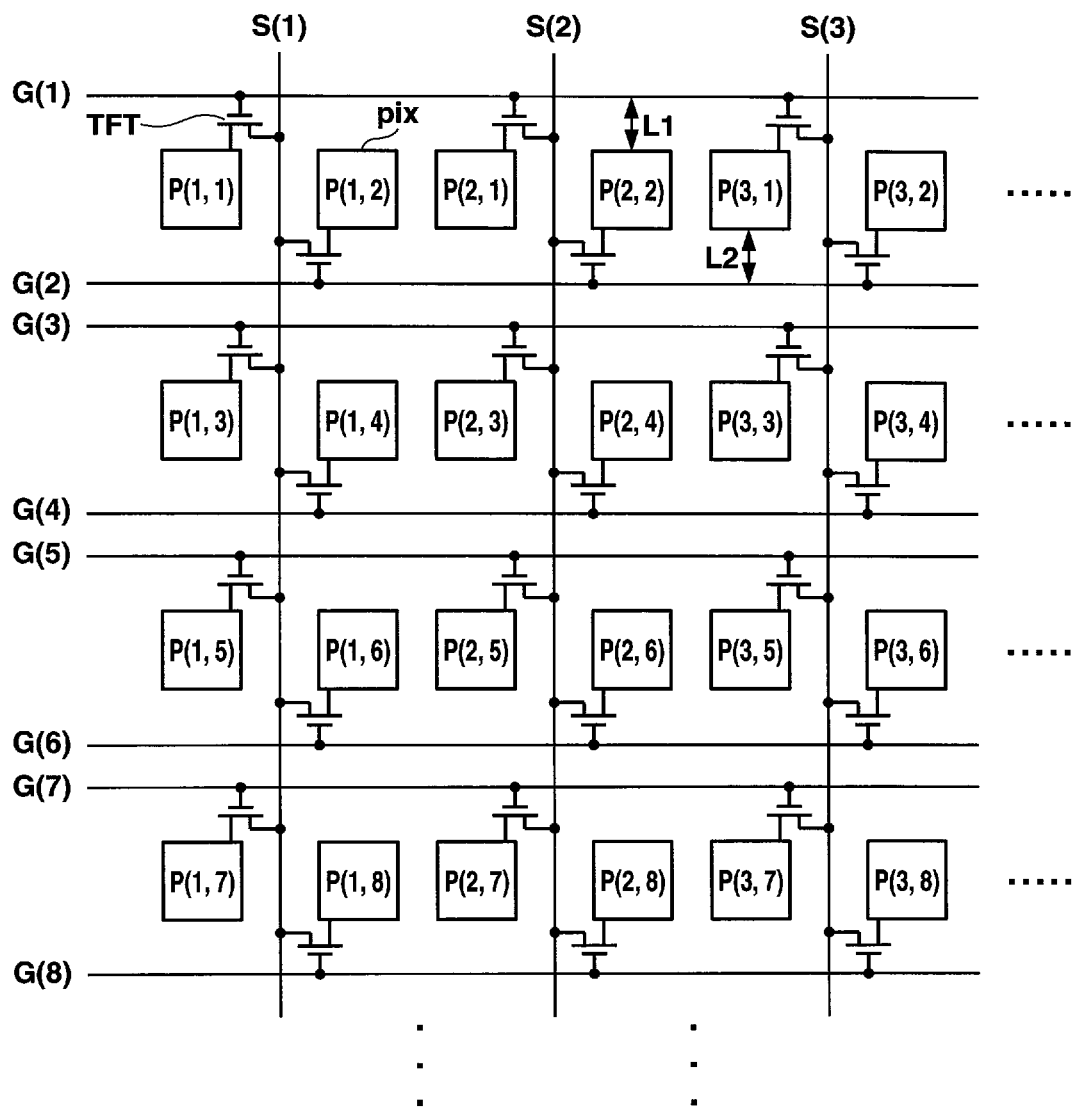
FIG. 3 is a figure showing a pixel arrangement in an LCD part.
Figure 4:
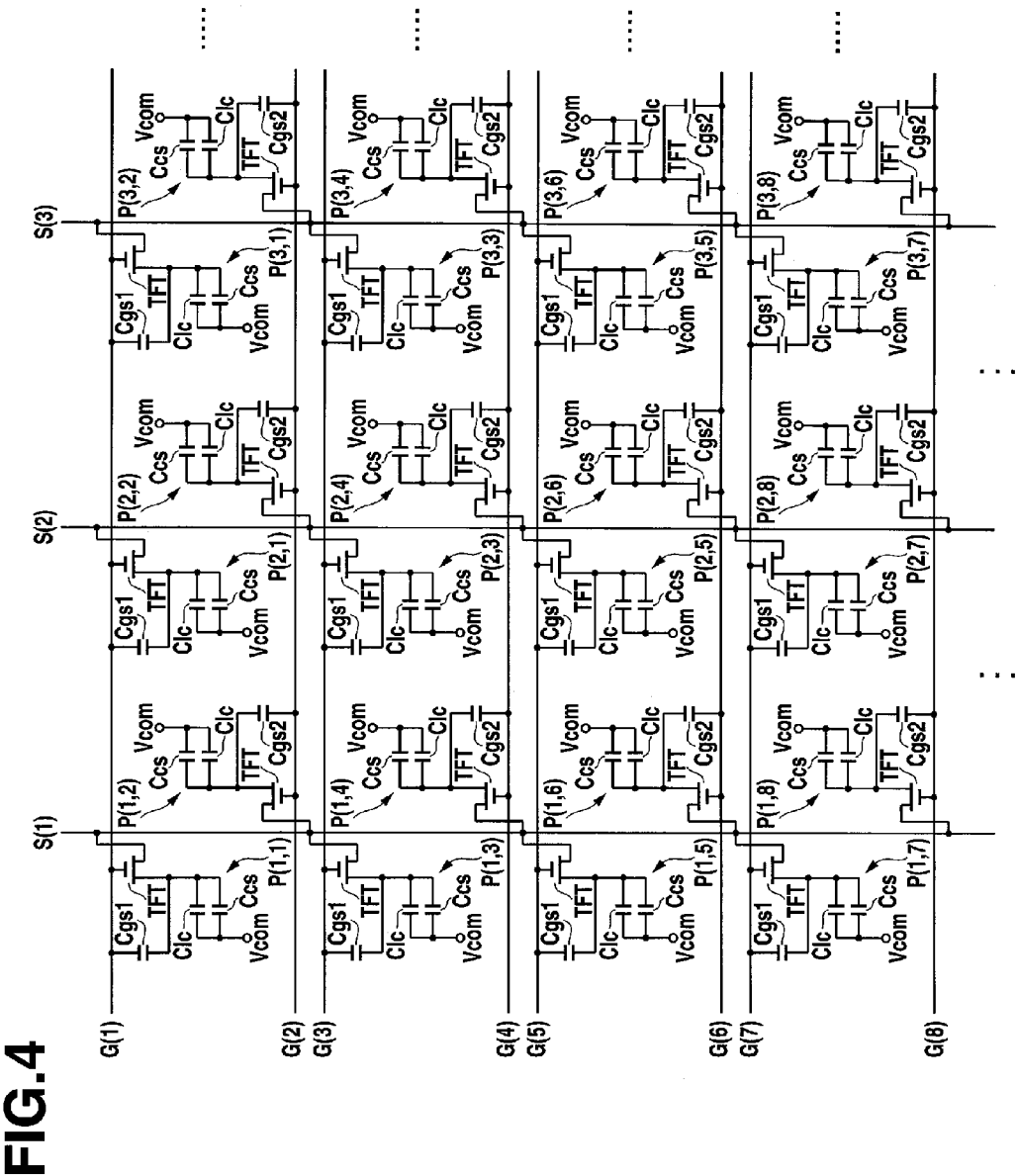
FIG. 4 is an equivalent circuit diagram of the LCD part.

The LCD part 10 is configured to sandwich a liquid crystal LC between two substrates 10a and 10b that are arranged opposite to each other and are bonded with a seal material 10c. On the opposing surface of the one substrate 10b, as shown in FIGS. 3 and 4, a plurality of pixels P (i, j) arranged in a matrix, a plurality of scanning lines G (j) for sequentially scanning the respective pixels P (i, j) every prescribed number, and a plurality of data lines S (j) for providing display signal voltages to be written onto the respective pixels P (i, j) are formed. Each of the pixels P (i, j) is provided with a TFT, as a switching element, that has a gate electrode connected to the scanning line G (j) and a drain electrode connected to the data line S (j); a pixel electrode "pix" that is connected to the source electrode of the TFT; and with an auxiliary capacitor Ccs for storing charges to maintain, at a prescribed voltage differential, the voltage differential between the pixel electrode pix and a common electrode Gn that is formed on the other substrate 10a. Here, i=1, 2, 3, - - - , x, and j=1, 2, 3, - - - , y. The common electrode Gn is configured to assume a common opposite voltage for all the pixels when provided with a common signal Vcom. That is, the common electrode Gn is formed on the entire area of the opposing surface of the other substrate 10a, for example.

Here, the data lines S (i) and the scanning lines G (j) are arranged so as to intersect with each other. Each pixel P (i, j) is connected to one of the data lines S (i) and to one of the scanning lines G (j) at a location adjacent to their intersection through a TFT, which is used as a switching element as described above. Further, for every two pixels, the pixels, which are adjacent to each other, are connected so as to share one data line S (i). In addition, the respective TFTs for these two pixels P (i, j) are connected to the different scanning lines G (j), respectively.

For example, in FIGS. 3 and 4, the TFT for the upper-left pixel P (1, 1) is connected to the scanning line G (1) and to the data line S (1), and the TFT for the immediate right pixel P (1, 2) is connected to the scanning line G (2) and to the data line S (1). The pixels P (1, 1) and P (1, 2) are arranged between the scanning line G (1) and the scanning line G (2).

In addition, the pixel P (1, 2) is located across the data line S (1) adjacently with respect to the pixel P (1, 1). However, pixel P(1, 3) is located so as not to cross any data line S (i) with respect the pixel P (2, 1) that is adjacently located in the opposite side from the pixel P (1, 1). The pixel P (2, 1) is located adjacent to the pixel P(2, 2) across the data line S (2).

Figure 5:
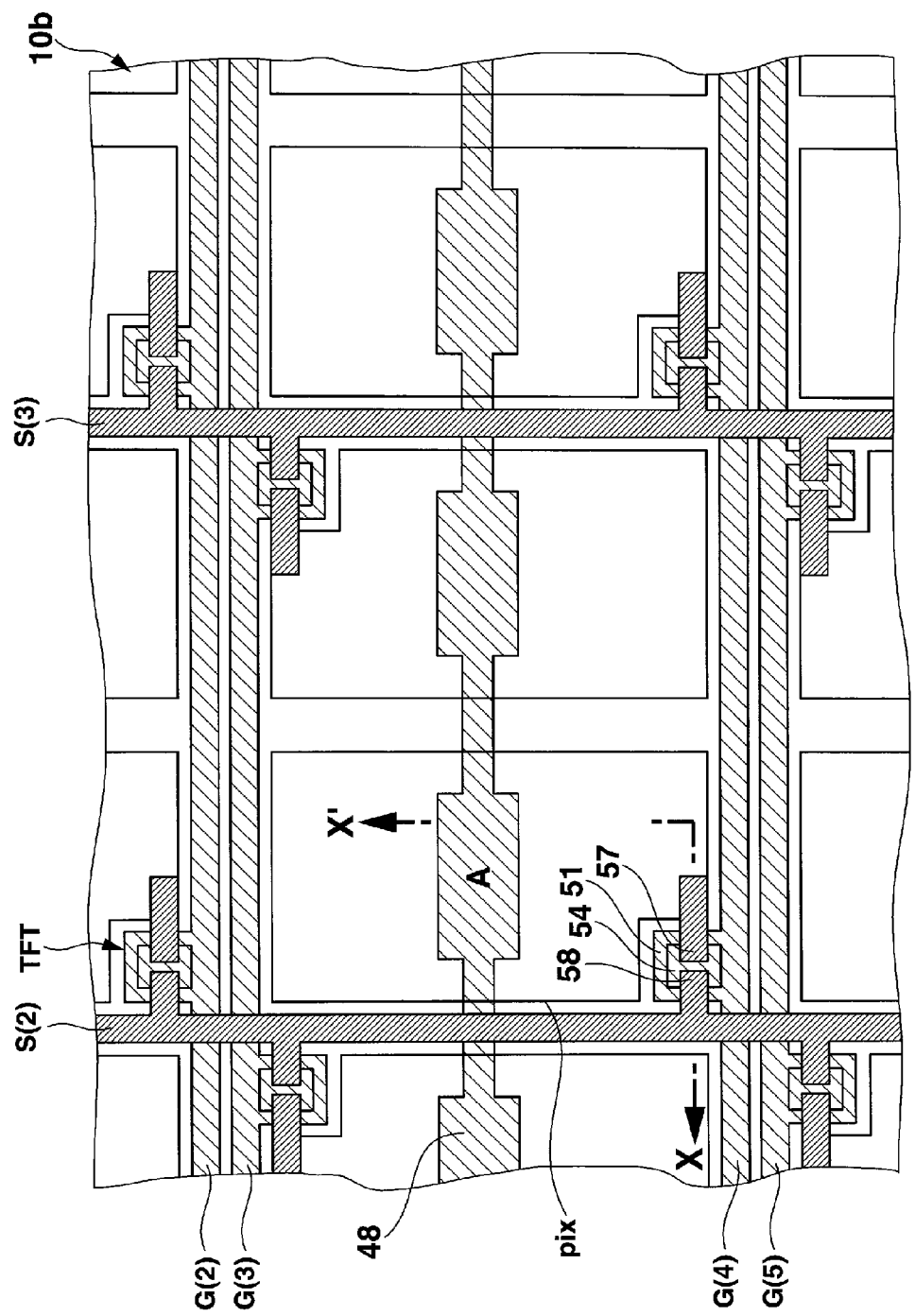
FIG. 5 is a top view of pixels.
Figure 6:
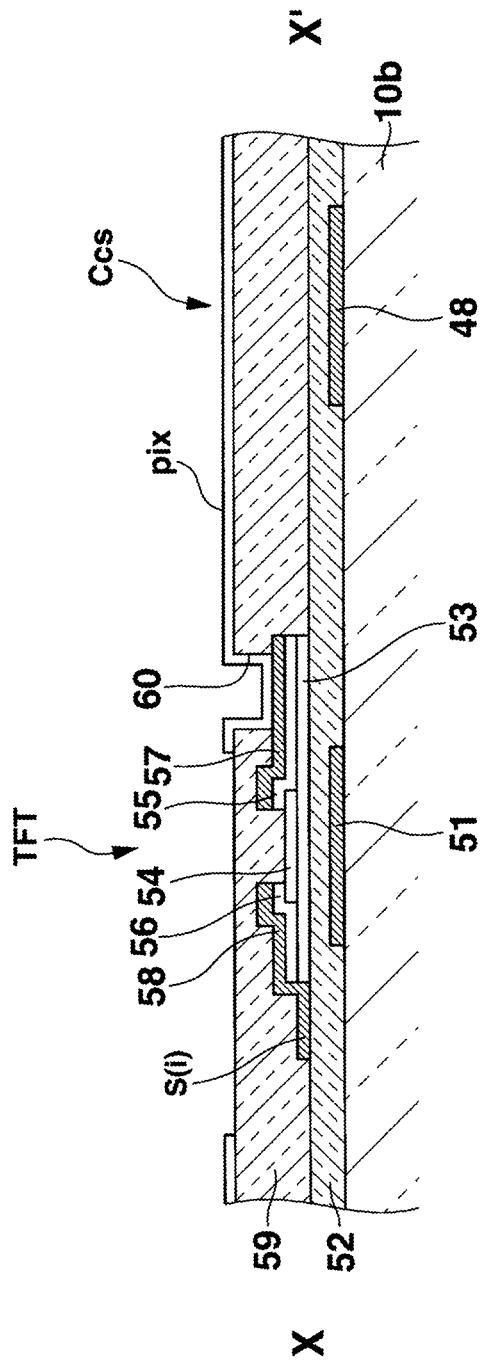
FIG. 6 is a cross-section view of the pixels.

A specific structure of the pixels P(i, j) will now be described with reference to FIGS. 5 and 6. The substrate 10b is provided with the scanning lines G(j) that include the gate electrodes 51. Auxiliary capacitance lines 48 are provided on the same layer as the scanning lines G(j). That is, the scanning lines G (j) and the auxiliary capacitance line 48 are formed together at once. A gate insulating film 52 is provided thereon in the entire area. A semiconductor thin film 53 that is composed of intrinsic amorphous silicon, for example, is provided on the gate insulating film 52. A channel protection film 54 is provided at an approximately center part on the top surface of the semiconductor film 53. Contact layers 55, 56 that are composed of n-typed amorphous silicon, for example, are provided on the respective sides of the channel protection film 54 and on the top surface of the semiconductor film 53 at the respective sides of the channel protection film 54.

On the contact layers 55, a source electrode 57 is provided. On the other contact layer 56 and on the gate insulating film 52, the data line S(i) including the drain electrode 58 is provided.

Consequently, the TFT is composed of the gate electrode 51, the gate insulating film 52, the semiconductor film 53, the channel protection film 54, the contact layers 55, 56, the source electrode 57 and the drain electrode 58.

A planarization film 59 is provided on the entire structure over the gate film 52 including the TFT. In the planarization film 59, a contact hole 60 is formed at a prescribed location corresponding to the source electrode 57. A pixel electrode "pix" that is made of ITO, for example, is formed at a prescribed location on the planarization film 59. The pixel electrode pix is connected to the source electrode 57 via the corresponding contact hole 60. In this example, the shape of the pixel electrode pix is formed so as to become a rotationally symmetrical shape among the pixels that are located adjacent to each other in the extending direction of the scanning lines G(j).

Here, portions of auxiliary capacitance lines 48 that overlap with the pixel electrodes pix become the respective auxiliary capacitance electrodes, and therefore the auxiliary capacitances Ccs are formed by the overlapped portions, respectively. The auxiliary capacitances Ccs in the pixels P (i, j) are configured to have the same amount of capacitance, respectively. The auxiliary capacitance lines 48 are electrically connected to the common electrode Gn (thereby assuming the same voltage as the common electrode). That is, the common signal Vcom is applied to the auxiliary capacitance lines 48 as well as to the common electrode Gn.

At each pixel P (i, j,), the display condition is controlled by changing the alignment state of the liquid crystal disposed between the pixel electrode pix and the common electrode Gn in accordance with the voltage differential between the pixel electrode pix and the common electrode Gn.

Because the liquid crystal LC is sandwiched between the pixel electrode pix and the common electrode Gn, liquid crystal capacitance Clc is formed thereby, and the amount of liquid crystal capacitance Clc is configured to be equal among the pixels. Further, the common electrode Gn may be provided on the substrate 10b. Therefore, this embodiment can be adapted to the in-plane electrical field method in which the voltage differential is generated in a direction along the surface of the substrate and is applied to the liquid crystal, as well as to the vertical electrical field method in which the voltage differential is generated between the two substrates and is applied to the liquid crystal.

Turning to FIGS. 1 and 2, the data lines S (i) and the scanning lines G (j) are electrically connected to the driver circuits 11 that are assembled and disposed on the right side of the LCD part 10 through groups of wirings 20S, 20G that are laid at the peripheral areas of the LCD part 10 on the substrate 10b. The common electrode Gn is electrically connected to the driver circuits 11 by electrically connecting to a wiring on the substrate 10b via a conductive material made of a resin, for example.

In the LCD part 10, the data lines S (i) are formed so as to extend in a direction parallel to the driver circuit 11, and the scanning lines G (j) are formed so as to extend towards the driver circuit 11. By using the above-described wiring structure, as compared with the structure in which each of the pixels arranged in the direction of the scanning line are associated with different respective data signal lines, the width of the wiring group 20S (i.e., the number of wires in the group) can be reduced to half.

Figure 7:
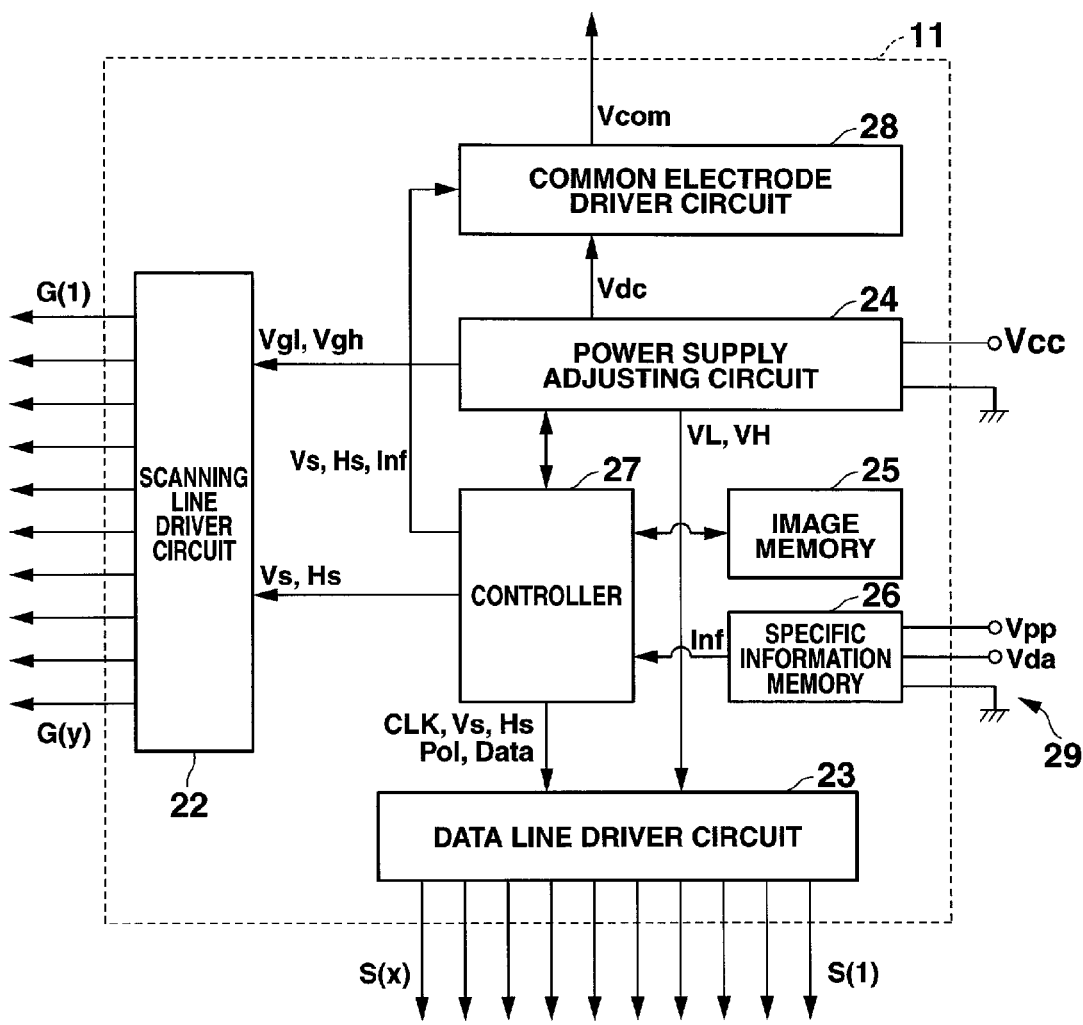
FIG. 7 is a block structure diagram of driver circuits.

As shown in FIG. 7, the driver circuit 11 is configured to include: a scanning line driver circuit 22 that drives the scanning lines G (j); a data line driver circuit 23 that drives the data lines S (i); a common electrode driver circuit 28 that drives the common electrode Gn and the auxiliary capacitance lines 48; a power supply adjusting circuit 24 that processes a prescribed reference voltage Vcc and outputs needed various driving voltages to the driver circuits 11; an image memory 25 that provisionally memorizes image data inputted from the exterior, for example; a specific information memory 26 that memorizes information specific to the particular LCD apparatus 1; and a controller 27 that synchronizes the respective driver circuits by outputting various control signals, which are described later, to the above-described drivers.

Figure 8:
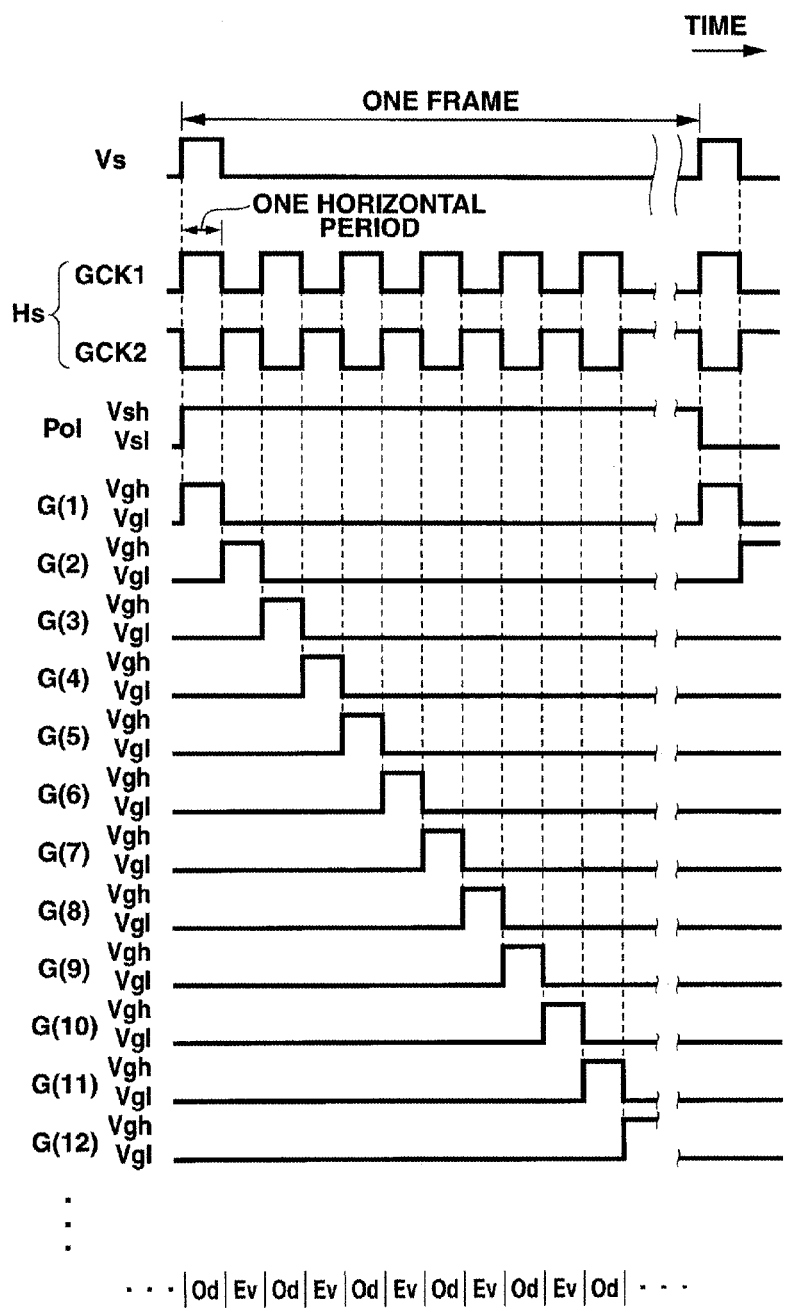
FIG. 8 is a chart showing an example of scanning signals in the respective scanning lines.

As shown in FIG. 8, the scanning line driver circuit 22 outputs scanning signals to the scanning lines G (j) in accordance with a vertical synchronous signal Vs that is output from the controller 27, and a first gate clock signal GCK1 and a second gate clock signal GCK2 that are used as horizontal synchronous signal Hs. The first gate clock signal GCK1 and the second gate clock signal GCK2 are rectangular wave signals that are reversed in phase with respect to each other.

Figure 9:
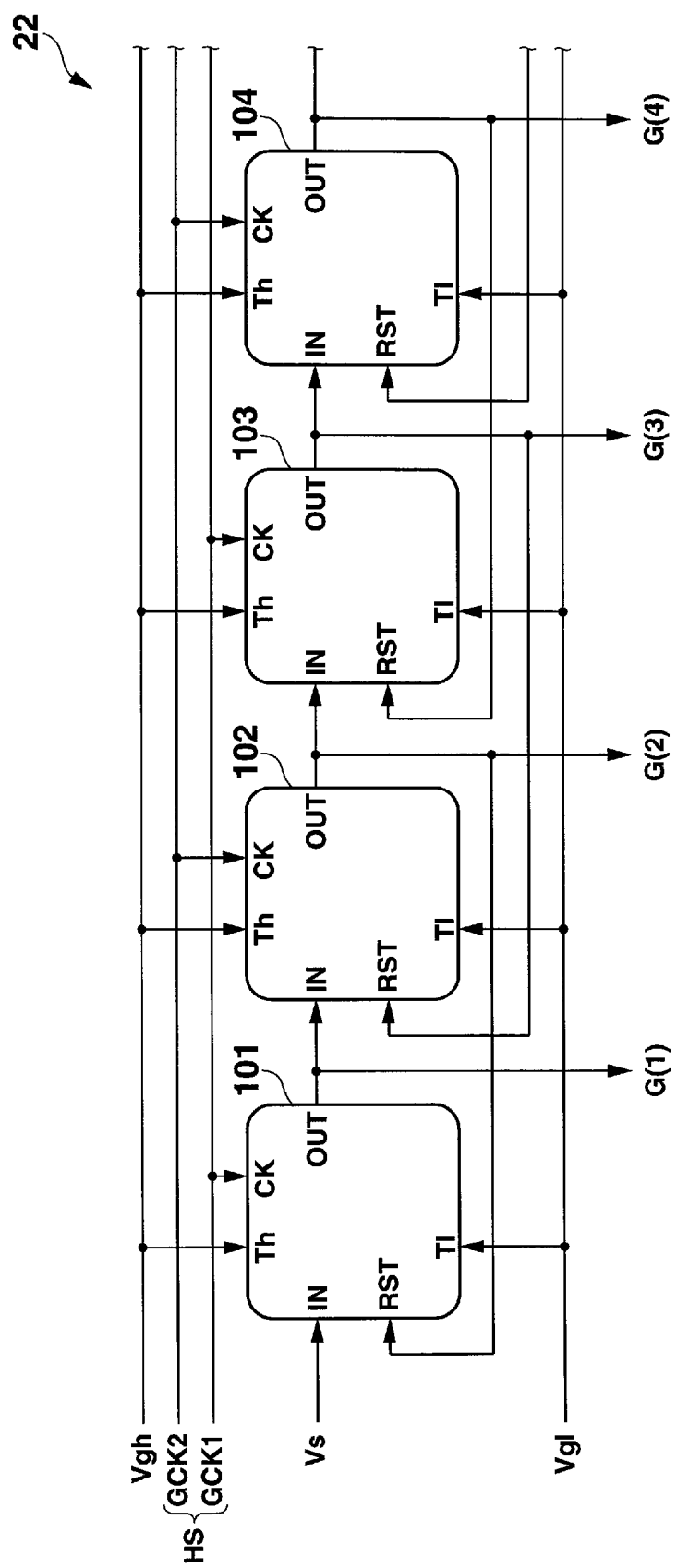
FIG. 9 is a schematic structure diagram of a scanning line driver circuit.

As shown in FIG. 9, a schematic structure of the main part of the scanning line driver circuit 22 is constructed such that holding circuits 101, 102, 103, 104, . . . , the number of which holding circuits is equal to the number of the scanning lines (y rows), are arranged in series. Each of the holding circuits includes: an input terminal IN; an output terminal OUT; a reset terminal RST; a clock signal input terminal CK; a high voltage power supply input terminal Th; and a low voltage power supply input terminal Tl. The input terminal IN of the holding circuit 101 in the first row is provided with the vertical synchronous signal Vs as the input signal for the first row. In the subsequent rows, the input terminal IN of the holding circuit is provided with the output signal from the previous holding circuit. The reset terminal RST of the holding circuit is provided with the output signal from the succeeding holding circuit. The reset terminal RST of the holding circuit in the last row (e.g., the yth row) can be provided with a separate reset signal END, or alternatively, can be provided with the output signal of the holding circuit 101 in the first row.

In addition, the clock signal input terminal CK of the holding circuits in odd-numbered rows is provided with the first gate clock signal GCK1, and that of the holding circuits in even-numbered rows is provided with the second gate clock signal GCK2, which is reversed in phase with respect to the first gate clock signal GCK1. The high voltage power supply input terminal Th of each holding circuit is supplied with a prescribed high voltage Vgl, and the low voltage power supply input terminal Tl of each holding circuits is supplied with a prescribed low voltage Vgl.

Figure 10:
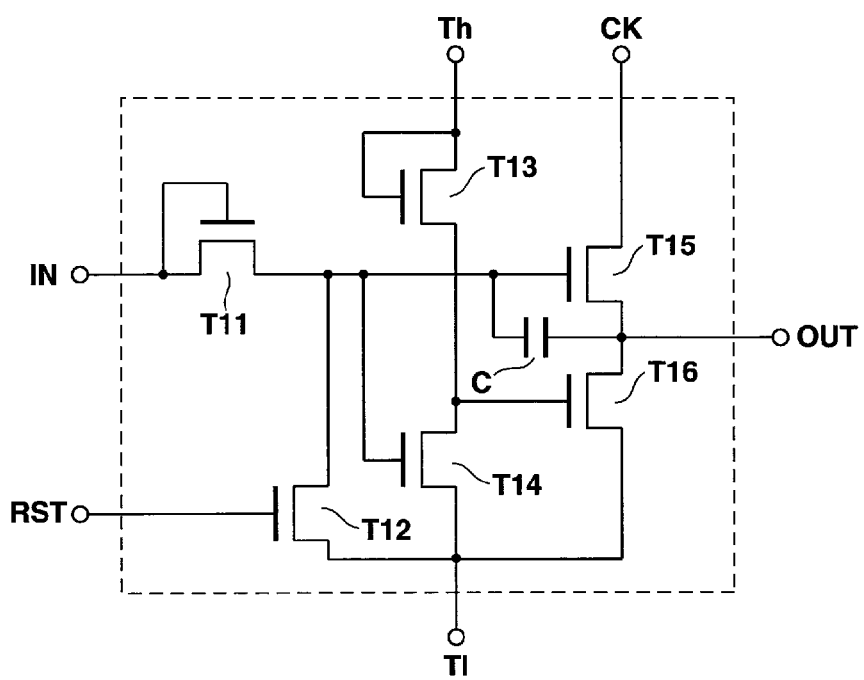
FIG. 10 shows an example of a holding circuit.

As shown FIG. 10, each of the holding circuits 101, 102, 103, 104, . . . , includes six MOS field effect transistors (hereinafter referred to as MOS transistor) T11-T16 and a capacitor C.

As shown in FIG. 8, the above-described scanning line driver circuit 22 initiates scanning for one frame in response to the vertical synchronous signal Vs. The scanning line driver circuit 22 then performs a voltage output that is switched from the low level voltage Vgl to the high level voltage Vgh only during the prescribed period in accordance with the first gate clock signal GCK1 and the second gate clock signal GCK2 for each scanning line progressively from the first scanning line G (1) to the last scanning line G (y).

That is, progressively with respect to the scanning lines G(j), the scanning line driver circuit 22 turns on the TFTs (i, j) connected to the selected scanning line G (j) so that respective display signal voltages outputted on the data lines S(i) at that time are written onto the corresponding pixels P(i, j), respectively.

Thus, when a scanning line in an odd-numbered row is selected, the respective display signal voltages are written onto the pixel electrodes of the respective pixels associated with the selected scanning line that are located in odd-numbered columns, and when a scanning line in an-even numbered row is selected, the respective display signal voltages are written onto the pixel electrodes of the respective pixels associated with the selected scanning line that are located in even-numbered columns. In other words, the odd-numbered scanning line and the even-numbered scanning line that are located adjacently across a particular row of pixels are successively selected so that respective display voltages are written onto all of the pixels in the row situated between these scanning lines.

The data line driver circuit 23 outputs the display signal voltages for the respective data lines S (i) to the corresponding data lines S (i), respectively, which are provided in the display panel 11, at a prescribed timing in accordance with the horizontal synchronous signal Hs, the vertical synchronous signal Vs, image data Data, and the reference clock CLK that are input from the controller 27.

Figure 11:
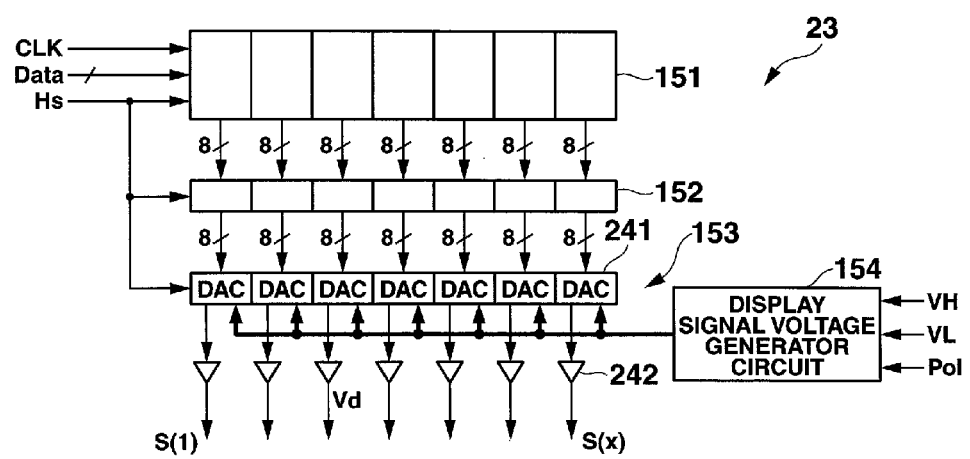
FIG. 11 shows an example of a data line driver circuit.

As shown in FIG. 11, the functional block structure of the data line driver circuit 23 includes a sampling memory 151, a data latch circuit 152, a D/A converter circuit (DAC) 153, and a display signal voltage generator circuit 154.

In synchronization with the horizontal synchronous signal Hs and the reference clock signal CLK, which are output from the controller 27, the sampling memory 151 fetches the image data for the pixels that are associated with one scanning line from the image memory 25. The sampling memory 151 does this progressively for every scanning line in the order from the top row to the bottom row. The sampling memory 151 has data storage areas the number of which is equal to the number of the data lines S (i). That is, with respect to each scanning line, the sampling memory 151 fetches the image data corresponding to that scanning line, and stores the fetched image data in the corresponding data storage areas for the data lines S (i), respectively. Here, the image data includes a gray scale level that should be displayed in the pixel, and the gray scale level for each pixel is expressed, for example, by 8-bit digital data. The digital data of 8 bits is stored in each data storage area, in such a case.

The image data for one horizontal period that are fetched by the sampling memory 151 are transmitted from the sampling memory 151 to the data latch circuit 152 in accordance with a demand from the data latch circuit 152. Once the image data are transmitted to the data latch circuit 152, the sampling memory 151 starts fetching image data for the scanning line in the next row as the image data for the next one horizontal period. This process is carried out in synchronization with the horizontal synchronous signal Hs.

In accordance with the horizontal synchronous signal Hs, the data latch circuit 152 fetches the image data for the one horizontal period from the sampling memory 151 at once, and outputs the fetched image data to the subsequent D/A converter circuit 153.

The D/A converter circuit 153 is composed of a plurality of DAC parts 241 and a plurality of output amplifier circuits 242. The D/A converter circuit 153 converts the respective image data that are output from the data latch circuit 152 into the corresponding analogue display signal voltages by appropriately selecting display signal voltages provided form the display signal voltage generator circuit 154. The thus generated analogue display signal voltages are applied to the respective data lines S (i) via output amplifier circuits 242.

At that time, the D/A converter circuit 153 converts the digital image data outputted from the data latch circuit 152 into the analogue display signal voltages in accordance with a polarity reverse signal Pol that is output from the controller 27. Specifically, when the polarity reverse signal Pol is in the state of high Vsh, the D/A converter circuit 153 performs the D/A conversion of the image data output from the data latch circuit 152 into a display signal voltage having a positive polarity, and when the polarity reverse signal Pol is in the sate of low Vsl, the D/C converter circuit 153 performs the DA conversion of the image data outputted from the data latch circuit 152 into a display signal voltage having a negative polarity. In other words, when the polarity reverse signal Pol is in the state of high Vsh, the D/C converter circuit 153 performs the D/C conversion such that the voltage applied to the liquid crystal has a positive polarity, and when the polarity reverse signal Pol is in the state of low Vsl, the D/C converter circuit 153 performs the D/C conversion such that the voltage applied to the liquid crystal has a negative polarity. That is, the D/C converter circuit 153 generates two different voltage levels as the display signal voltage for each gray scale level.

Figure 12A:
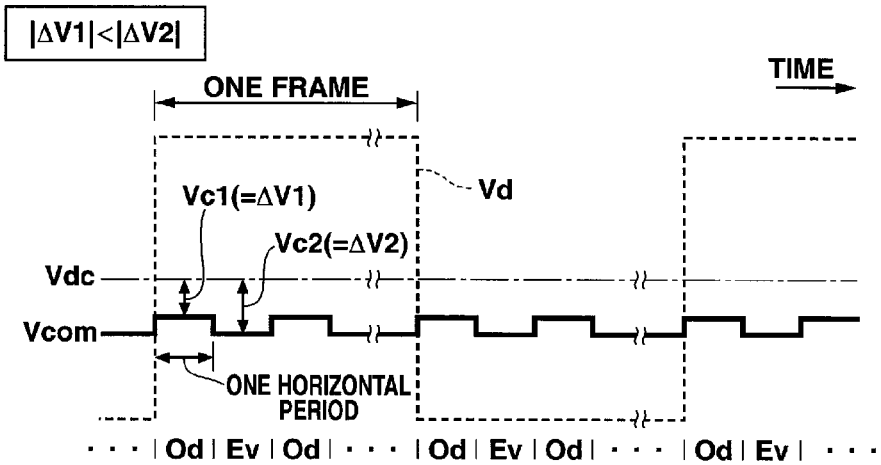
FIG. 12A shows an example of a common signal when an absolute value of $\Delta V2$ is larger than an absolute value of $\Delta V1$.
Figure 12B:
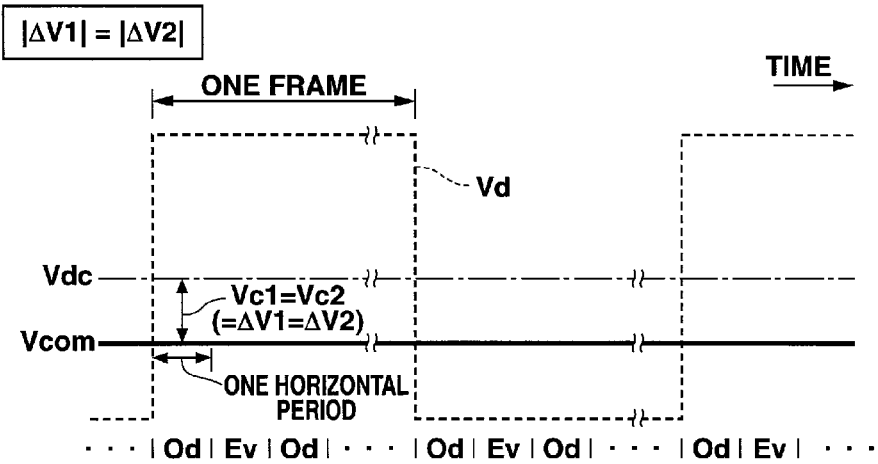
FIG. 12B shows an example of the common signal when the absolute value of $\Delta V1$ is equal to the absolute value of $\Delta V2$.
Figure 12C:
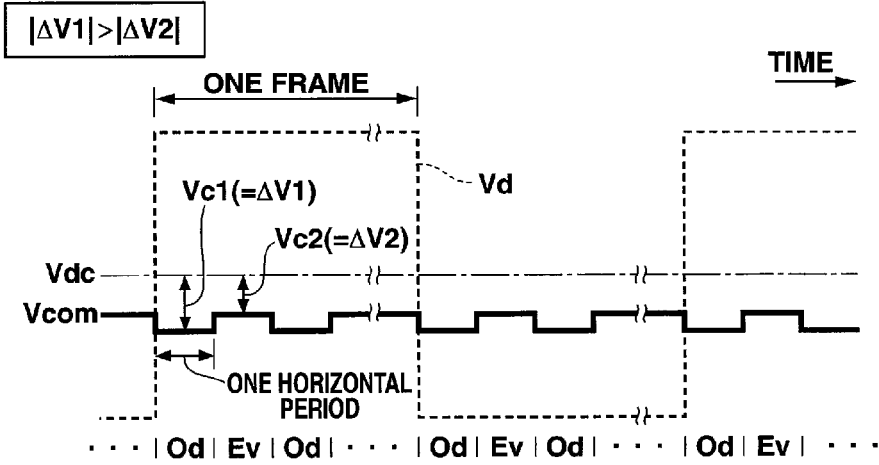
FIG. 12C shows an example of the common signal when the absolute value of $\Delta V2$ is smaller than an absolute value of $\Delta V1$.

The common electrode driver circuit 28 generates the common signal Vcom and supplies it to the common electrode Gn and to the auxiliary capacitance lines 48. As shown in FIGS. 12A, 12B, and 12C, the common electrode deriver circuit 28 generates the common signal Vcom by superimposing two kinds of offset voltages Vc1 and Vc2 alternately to the center-of-amplitude voltage Vdc of the display signal voltage Vd in accordance with the vertical synchronous signal Vs and the horizontal synchronous signal Hs. The two kinds of offset voltages Vc1, Vc2 will be described in more detail later. For the display signal voltages Vd, each voltage level for a prescribed gray scale level oscillates at a predetermined period based on the polarity reverse signal Pol around the center-of-amplitude voltage Vdc. The amplitude central voltage Vdc is therefore predetermined in advance together with a set of the predetermined display signal voltages Vd, which respectively correspond to respective gray scale levels. The amplitude central voltage Vdc is provided to the common electrode driver circuit 28 from the power supply adjusting circuit 24.

The first offset voltage Vc1 is a voltage superimposed on the amplitude central voltage Vdc when the pixels associated with an odd-numbered scanning line (e.g., the scanning line G (1))—that is, the pixels disposed adjacent to and at the respective left sides of the data lines S (i) (the pixels in odd-numbered columns)—are applied with the display signal voltages Vd. The first offset voltage Vc1 is determined so as to correspond to the pull-in voltage $\Delta V1$ (a voltage drop), which is generated upon the completion of writing the display signal voltages onto the pixels that are connected to the odd-numbered scanning line (i.e., when the TFTs change from the ON state to the OFF state; i.e., when the scanning signal changes from Vgh to Vgl).

The second offset voltage Vc2 is a voltage superimposed on the amplitude central voltage Vdc when the pixels associated with an even-numbered scanning line (e.g., the scanning line G (2))—that is, the pixels located adjacent to and at the respective right sides of the data lines S (i) (the pixels in even-numbered columns)—are applied with the display signal voltages Vd. The second offset voltage Vc2 is determined so as to correspond to the pull-in voltage $\Delta V2$ (a voltage drop), which is generated upon the completion of writing the display signal voltages onto the pixels that are connected to the even-numbered scanning line.

The amounts of the first offset voltage Vc1 and the second offset voltage Vc2 are determined based upon a space L1 between the odd-numbered scanning line and the pixel electrodes associated with the odd-numbered scanning line and a space L2 between the even-numbered scanning line and the pixel electrodes associated with the even-numbered scanning line. That is, the first offset voltage Vc1 and the second offset voltage Vc2 are generated in order to ensure that the voltage applied to the liquid crystal after the completion of each writing period (i.e., upon the completion of writing the corresponding display signal voltage onto the pixel electrode) accurately reflect the prescribed gray scale level for the pixels connected to the even-numbered scanning lines and for the pixels connected to the odd-numbered scanning lines, even if the values of parasitic capacitances Cgs differ between the pixels connected to the odd-numbered scanning lines and the pixels connected to the even-numbered scanning lines due to a vertical positional displacement (alignment error) of the pixel electrodes—i.e., a positional displacement of pixel electrodes relative to the scanning lines in a direction perpendicular to the extending direction of the scanning lines. The offset voltages Vc1 and Vc2 may be stored in the specific information memory 26 as information Inf specific to this particular LCD apparatus 1 in advance after determining appropriate values of Vc1 and Vc2.

Here, the pull-in voltage $\Delta V1$ generated when finishing the acquisition of the display signal voltages onto the pixels that are connected to the odd-numbered scanning lines and the pull-in voltage $\Delta V2$ generated when finishing the acquisition of the display signal voltages onto the pixels that are connected to the odd-numbered scanning lines may be calculated by the following equations.

$$\Delta V1 = \frac{(Vgh - Vgl) \times Cgs1}{(C1c + Ccs + Cgs1)} \approx \frac{(Vgh - Vgl) \times (\alpha/L1)}{\{C1c + Ccs + (\alpha/L1)\}}$$
$$\Delta V2 = \frac{(Vgh - Vgl) \times Cgs2}{(C1c + Ccs + Cgs2)} \approx \frac{(Vgh - Vgl) \times (\alpha/L2)}{\{C1c + Ccs + (\alpha/L2)\}}$$

Equations 1

Here, Cgs1 is a parasitic capacitance between an odd-numbered scanning line and the pixel electrode of the pixels associated with the odd-numbered scanning line, and Cgs2 is a parasitic capacitance between an even-numbered scanning line and the pixel electrode of the pixels associated with the even-numbered scanning line. "a" is a product of the electric permittivity of the dielectric and the effective area of the electrodes that constitute the parasitic capacitance.

Figure 21:
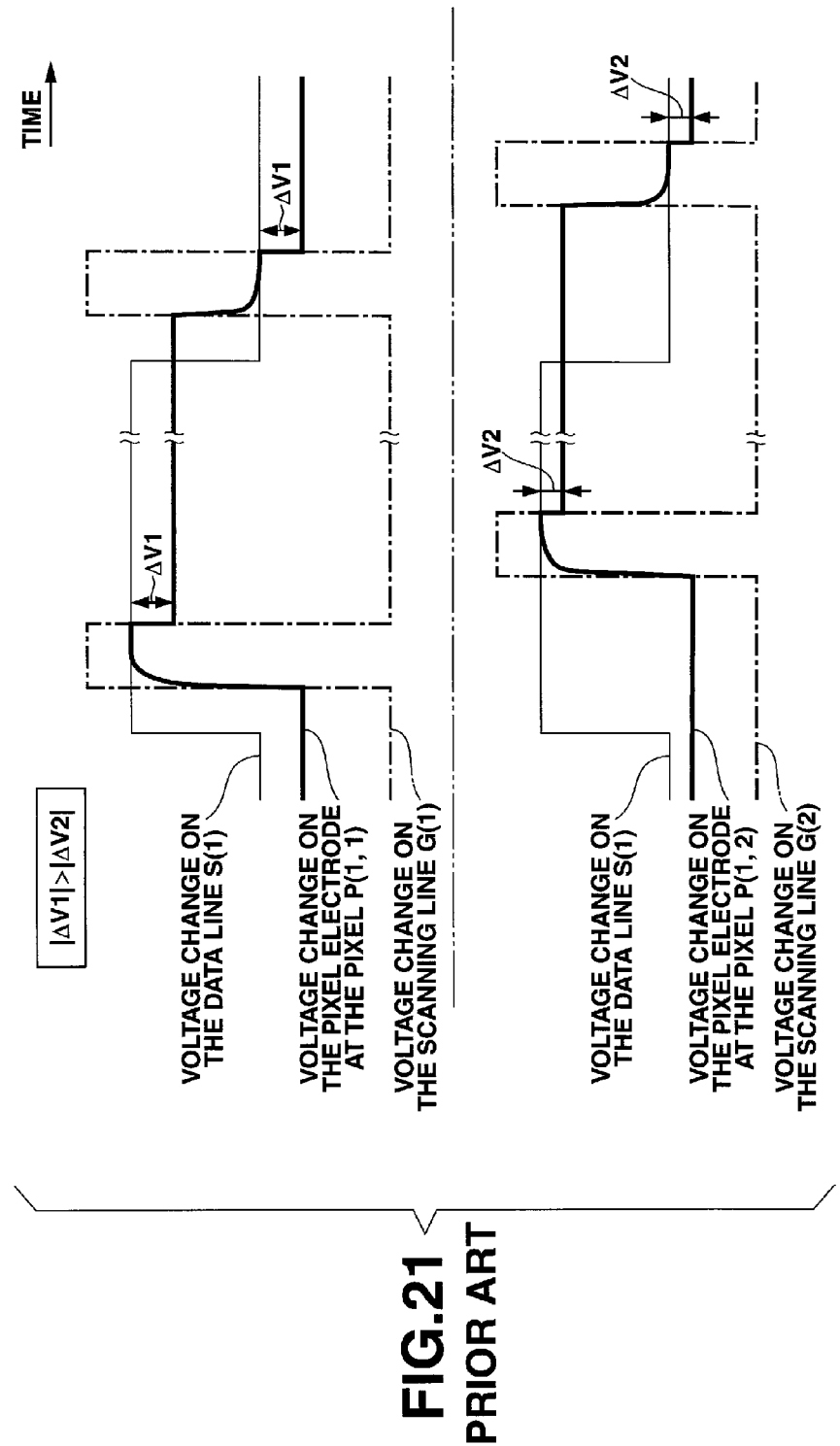
FIG. 21 is an explanatory diagram for the pull-in voltages in the conventional art.

In this exemplary embodiment, the amplitude central voltage Vdc is provided from the power supply adjusting circuit 24. The specific information Inf, in which the second offset voltage Vc2 is set to $\Delta V2$ and the first offset voltage Vc1 is set to $\Delta V1$, is stored in the specific information memory 26 in advance, and the first offset voltage Vc1 and the second offset voltage Vc2 are alternately superimposed on the amplitude central voltage Vdc in the direction of the pull-in voltage generation. For example, when the pull-in voltages $\Delta V1$, $\Delta V2$ occur in the negative direction with respect to the display signal voltage Vd upon the writing operation (as shown in FIG. 21), the offset voltages Vc1, Vc2 are superimposed in the negative direction relative to the amplitude central voltage Vdc—that is, Vc1 and Vc2 are alternately subtracted from Vdc to generate Vcom.

FIG. 12A shows a case where the absolute value of $\Delta V2$ is larger than the absolute value of $\Delta V1$—that is, where a positional displacement of the pixel electrodes occurs in a direction perpendicular to the extending direction of the scanning lines such that the space L2 between the respective even-numbered scanning lines and the adjacent pixel electrodes connected to the even-numbered scanning lines is narrower (shorter) than the space L1 between the respective odd-numbered scanning lines and the pixel electrodes connected to the odd-numbered scanning lines (i.e., when the parasitic capacitance Cgs1 is smaller than the parasitic capacitance Cgs2). FIG. 12B shows a case where the absolute value of $\Delta V2$ is equal to the absolute value of $\Delta V1$—that is, a positional displacement of the pixel electrodes in a direction perpendicular to the extending direction of the scanning lines does not occur (no alignment error) so that the above-described spaces L1 and L2 become equal (i.e., the parasitic capacitance Cgs1 and the parasitic capacitance Cgs2 are equal). In addition, FIG. 12C shows a case where the absolute value of $\Delta V2$ is smaller than the absolute value of $\Delta V1$—that is, a positional displacement of the pixel electrodes in a direction perpendicular to the extending direction of the scanning lines occurs such that the space L2 between the respective even-numbered scanning lines and the adjacent pixel electrodes connected to the even-numbered scanning lines is wider (longer) than the space L1 between the respective odd-numbered scanning lines and the adjacent pixel electrodes connected to the odd-numbered scanning lines (i.e., when the parasitic capacitance Cgs1 is larger than the parasitic capacitance Cgs2). The notation "Od" shown in these figures indicates periods during which odd-numbered scanning lines are selected, and the notation "Ev" in the figures shows periods during which even-numbered scanning lines are selected.

Figure 13:
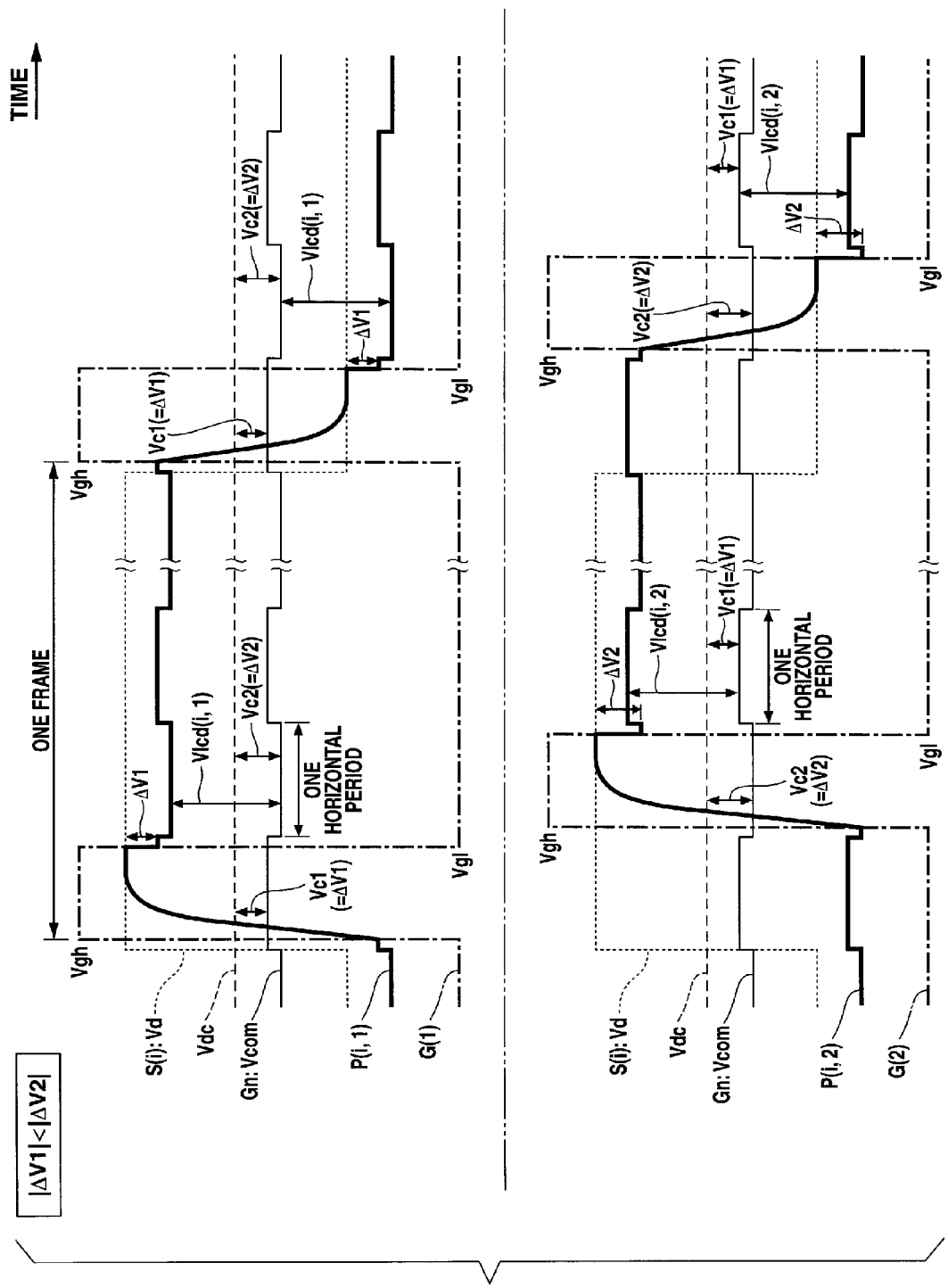
FIG. 13 shows a relation between the common signal and a voltage written onto a liquid crystal when the absolute value of $\Delta V2$ is larger than the absolute value of $\Delta V1$.
Figure 14:
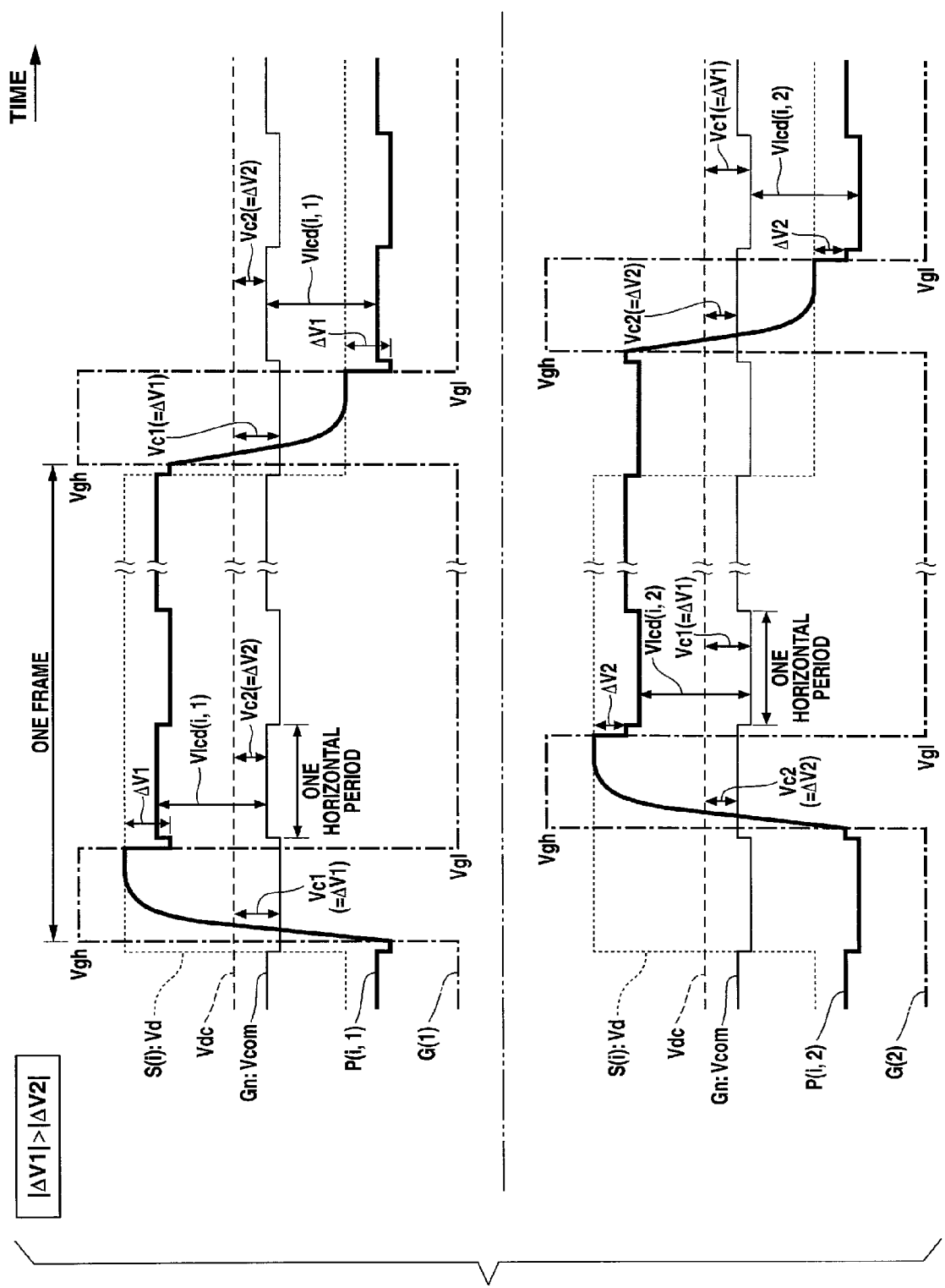
FIG. 14 shows a relation between the common signal and a voltage written onto the liquid crystal when the absolute value of $\Delta V2$ is smaller than the absolute value of $\Delta V1$.

By providing the common electrode Gn and the auxiliary capacitance electrodes (the auxiliary capacitance lines 48) with the common signal Vcom as described above, even if the values of parasitic capacitances Cgs differ between the pixels connected to the odd-numbered scanning lines and the pixels connected to the even-numbered scanning lines due to a positional displacement of the pixel electrodes in a direction perpendicular to the extending direction of the scanning lines, as shown in FIGS. 13 and 14, the voltages applied across the corresponding liquid crystal cells accurately reflect the display signal voltage Vd-Vcom corresponding to the specified gray scale levels for the respective pixels. For example, when the same display signal voltage Vd is to be applied to a pixel connected to an odd-numbered scanning line (e.g., P (i, 1)) and to a pixel connected to an adjacent even-numbered scanning line (e.g., P (i, 2)), the voltages Vlcd (i, 1) and Vlcd (i, 2) applied to the respective liquid crystal cells can be maintained to be equal because of this adjustment. Thus, deterioration of the display quality can be prevented.

FIG. 13 shows a case where the absolute value of $\Delta V2$ is larger than the absolute value of $\Delta V1$; that is, when a positional displacement of the pixel electrodes in a direction perpendicular to the extending direction of the scanning lines occurs such that the space L2 between the even-numbered scanning lines and the pixel electrodes connected to the even-numbered scanning lines is narrower (shorter) than the space L1 between the odd-numbered scanning lines and the pixel electrodes connected to the odd-numbered scanning lines.

FIG. 14 shows a case where the absolute value of $\Delta V2$ is smaller than the absolute value of $\Delta V1$; that is, when a positional displacement of the pixel electrodes in a direction perpendicular to the extending direction of the scanning lines occurs such that the space L2 between the even-numbered scanning lines and the pixel electrodes connected to the even-numbered scanning lines is wider (longer) than the space L1 between the odd-numbered scanning lines and the pixel electrodes connected to the odd-numbered scanning lines. In FIGS. 13 and 14, in order to show time-varying voltage changes clearer, a time interval between the time at which the scanning signal for the odd-numbered scanning line changes from Vgh to Vgl and the time at which the scanning signal for the even-numbered scanning line changes from Vgl to Vgh is shown in an exaggerated manner as compared with the timing charts shown in FIG. 8 and FIG. 12.

The specific information memory 26 can employ an EEPROM (Electrically Erasable Programmable ROM) that is one of nonvolatile memories, for example. In this case, the EEPROM is not written with any information (i.e., in the blank state) when the LCD apparatus 1 is initially produced. After manufacturing the LCD apparatus 1, by connecting a writing signal terminal 29 to a writing system apparatus for the EEPROM, for example, the above-described prescribed information that depends on the finished characteristics of the LCD apparatus 1 is stored in the specific information memory 26. In this case, the writing voltage Vpp to the specific information memory 26 is preferably configured to be higher than the reference voltage Vcc that is input into the power supply adjusting circuit 24 in order to prevent inadvertent erasure of the information stored in the specific information memory 26 due to an influence of the reference voltage Vcc.

In determining the values of Vc1 and Vc2, various methods can be employed in addition to or in place of using the above-described equations. For example, the LCD apparatus 1 just manufactured can be attached to a test equipment so that the actual display conditions are observed while the values of Vc1 and Vc2 are changed as adjustable parameters to determine the optimum values of Vc1 and Vc2. Additionally or in the alternative, the test/dummy pixels connected to an even-numbered scanning line and to an odd-numbered scanning line, respectively, can be provided in the LCD apparatus 1 so that the actual voltages applied to the pixel electrode and to the common electrode for these dummy pixels are measured to determine and confirm the optimum values of Vc1 and Vc2. Moreover, the plan pattern of the pixels can be observed by optical microscope to estimate the amount of the positional displacement of the pixel electrodes relative to the array of the scanning lines to make an initial estimate for the values of Vc1 and Vc2. Moreover, a series of experiments using one or more of the above-described methods can be conducted on the LCD apparatus to accumulate data sufficient to establish an empirical relationship between the distances L1 and L2 and the Vc1 and Vc2. Once such a relationship is established, measuring the distances L1 and L2 may produce the appropriate values for Vc1 and Vc2. In other words, Equations 1 described above may be refined by experiments so that simple measurements of L1 and L2 can produce reliable values of Vc1 and Vc2. Moreover, instead of employing a semi-permanent memory such as EEPROM, the above-mentioned dummy/test pixels may be connected to a test circuitry which can be made as a part of the LCD apparatus so that the adjustment of the optimum values of Vc1 and Vc2 can be performed automatically in a feedback manner every time the LCD apparatus is turned on or when the corresponding operation is selected by the user, for example. Various other modifications and methodologies are possible to determine the values of Vc1 and Vc2.

According to the above-described structure, even when a positional displacement occurs for pixel electrodes, the optimum values for the offset voltages Vc1, Vc2 can be prescribed for each individual LCD apparatus.

Figure 15:
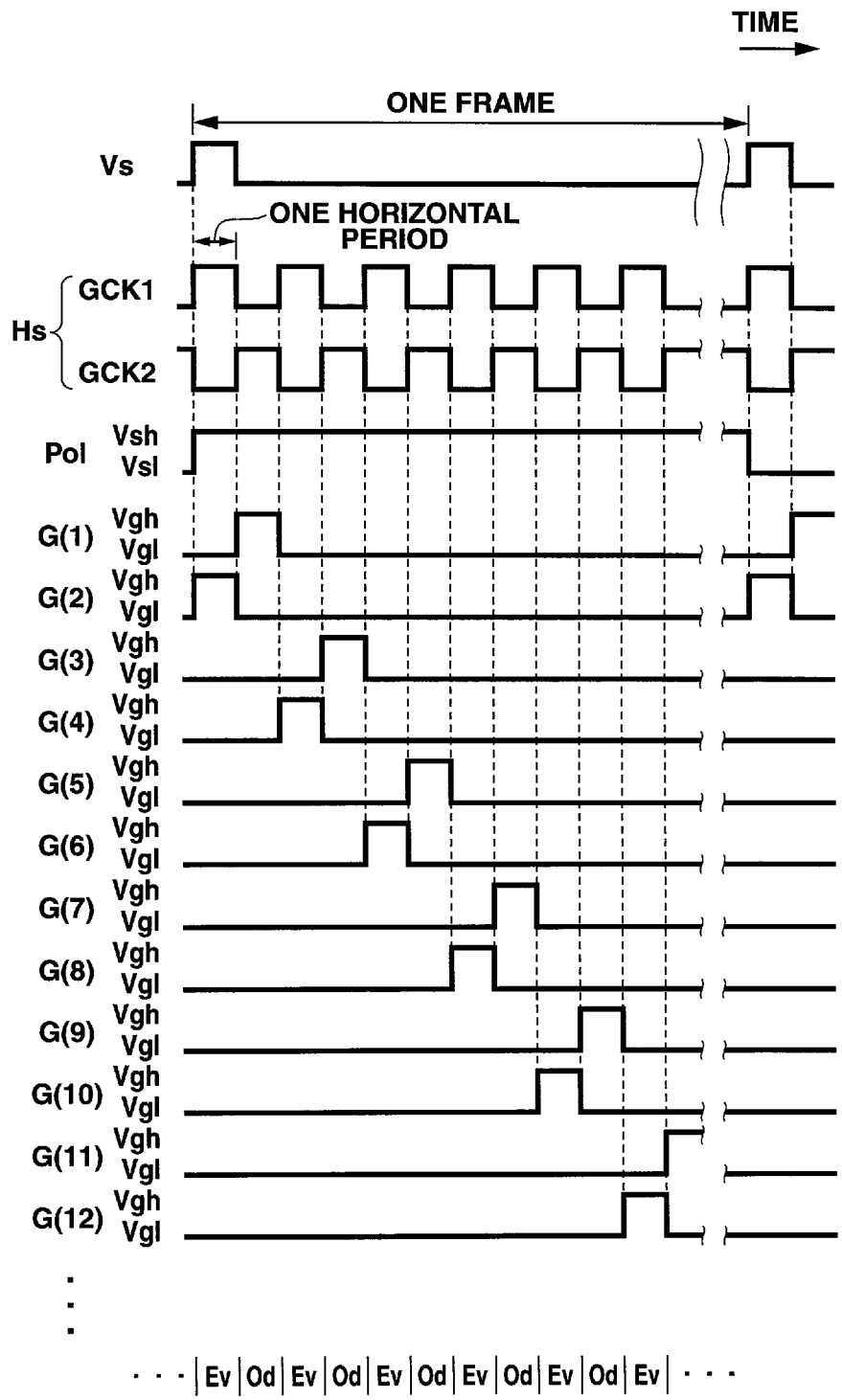
FIG. 15 shows a variation of the scanning signals in the respective scanning lines.

The above-described exemplary embodiments describe a case in which, between the adjacent two scanning lines disposed across a row of pixels, the even-numbered scanning line is selected after the odd-numbered scanning line is selected. However, in the alternative, as shown in FIG. 15, between the adjacent two scanning lines disposed across a row of the pixels, the odd-numbered scanning line may be selected after the even-numbered scanning line is selected.

In addition, in the above-described exemplary embodiments, a case where that the power supply adjusting circuit 24 provides the common electrode driver circuit 28 with the amplitude central voltage Vdc is described. Alternatively, the power supply adjusting circuit 24 may provide the common electrode driver circuit 28 with a voltage that is different from the amplitude central voltage Vdc, and the common electrode driver circuit 28 may process the voltage provided from the power supply adjusting circuit 24 in accordance with information prescribed in advance. Moreover, the functions and voltage signal transmitting schemes shown in FIG. 7 represent one possible way to implement the embodiments of the present invention. However, as indicated above, the present invention is not limited to this particular configuration. Various modifications, such as where the controller 27 is configured to assume the functions performed by other blocks, for example, are possible.

Figure 16A:
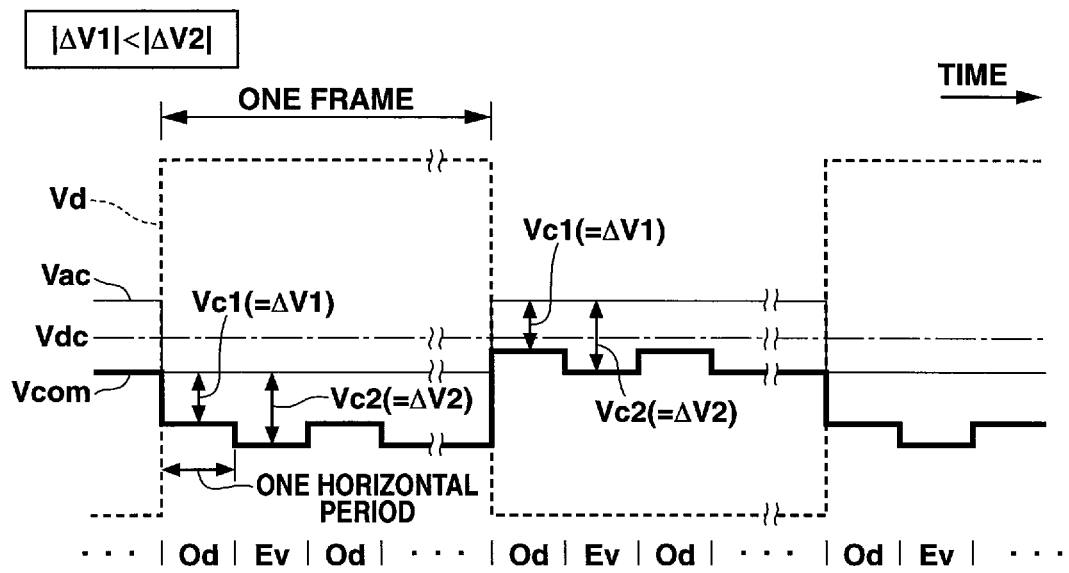
FIG. 16A shows a variation of the common signal when the absolute value of $\Delta V2$ is larger than the absolute value of $\Delta V1$.
Figure 16B:
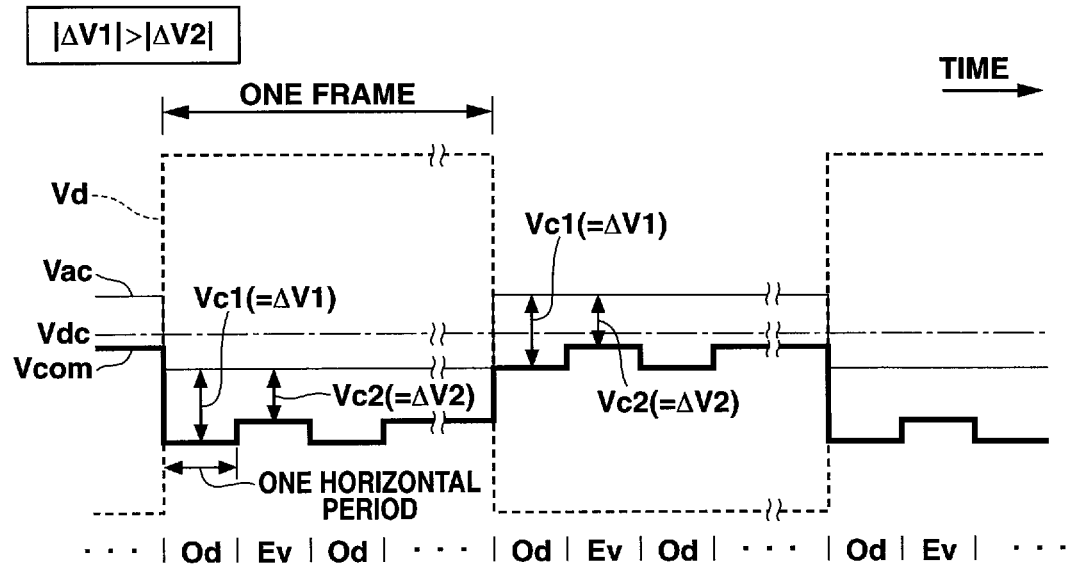
FIG. 16B shows a variation of the common signal when the absolute value of $\Delta V2$ is smaller than the absolute value of $\Delta V1$.

Moreover, in the above-described exemplary embodiments, a case where the power supply adjusting circuit 24 provides the common electrode driver circuit 28 with a DC voltage as the amplitude central voltage Vdc is described. However, as shown in FIG. 16A and FIG. 16B, an LCD apparatus can be configured such that the power supply adjusting circuit 24 provides the common electrode driver circuit 28 with a rectangular wave AC voltage Vac whose amplitude central voltage is equal to the above-described amplitude central voltage Vdc, and the common electrode driver circuit 28 superimposes the offset voltages Vc1, Vc2 on the rectangular-wave AC voltage Vac. This configuration is advantageous in appropriate cases because it allows a relatively large voltage can be applied to the liquid crystal even when the display signal voltages Vd are set to small values.

Figure 17A:
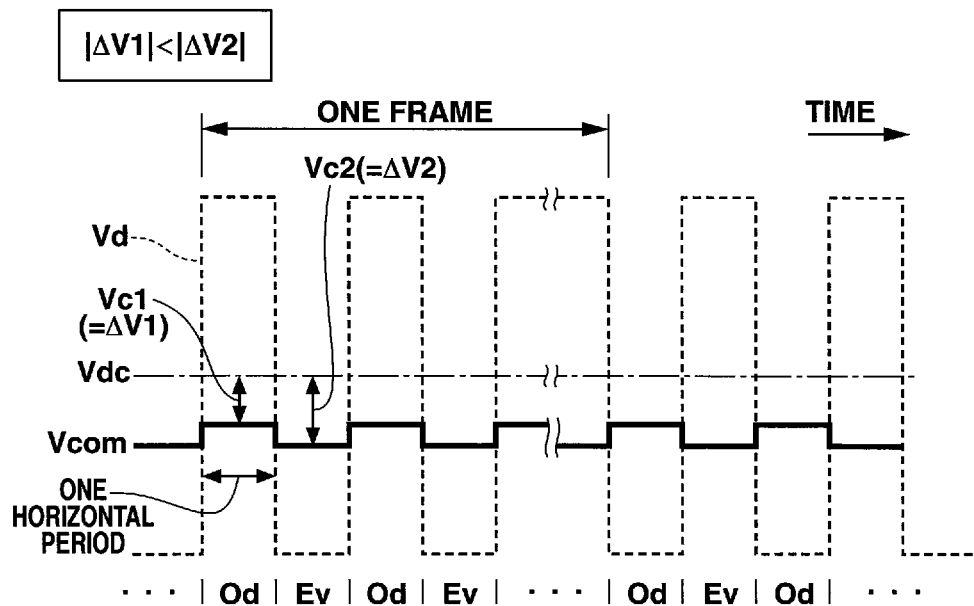
FIG. 17A shows a relation between the display signal voltage and the common signal in the case of the line inversion drive or the dot inversion drive, and shows the case where the absolute value of $\Delta V2$ is larger than the absolute value of $\Delta V1$.
Figure 17B:
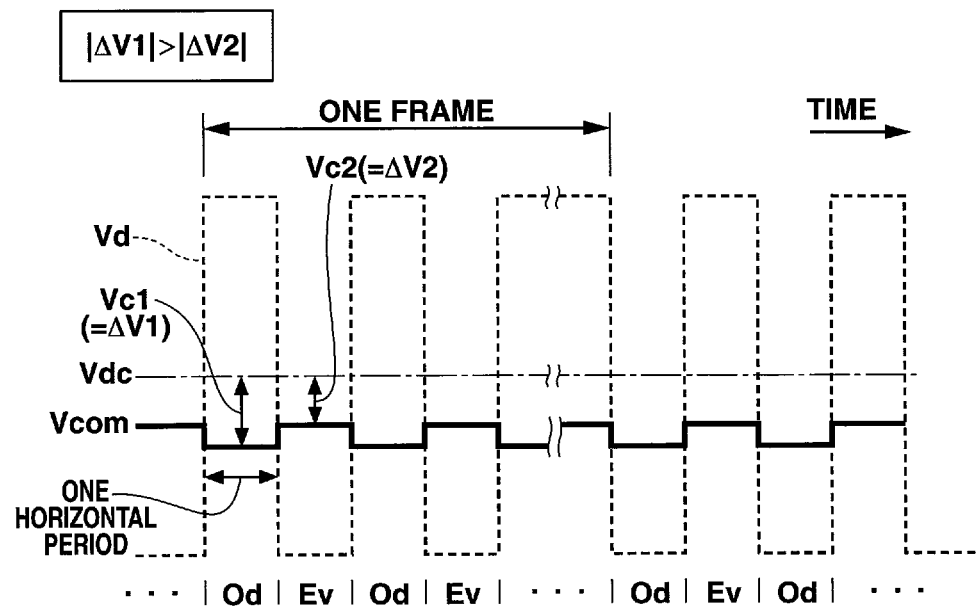
FIG. 17B shows a relation between the display signal voltage and the common signal in the case of the line inversion drive or the dot inversion drive, and shows the case where the absolute value of $\Delta V2$ is smaller than the absolute value of $\Delta V1$.
Figure 18:
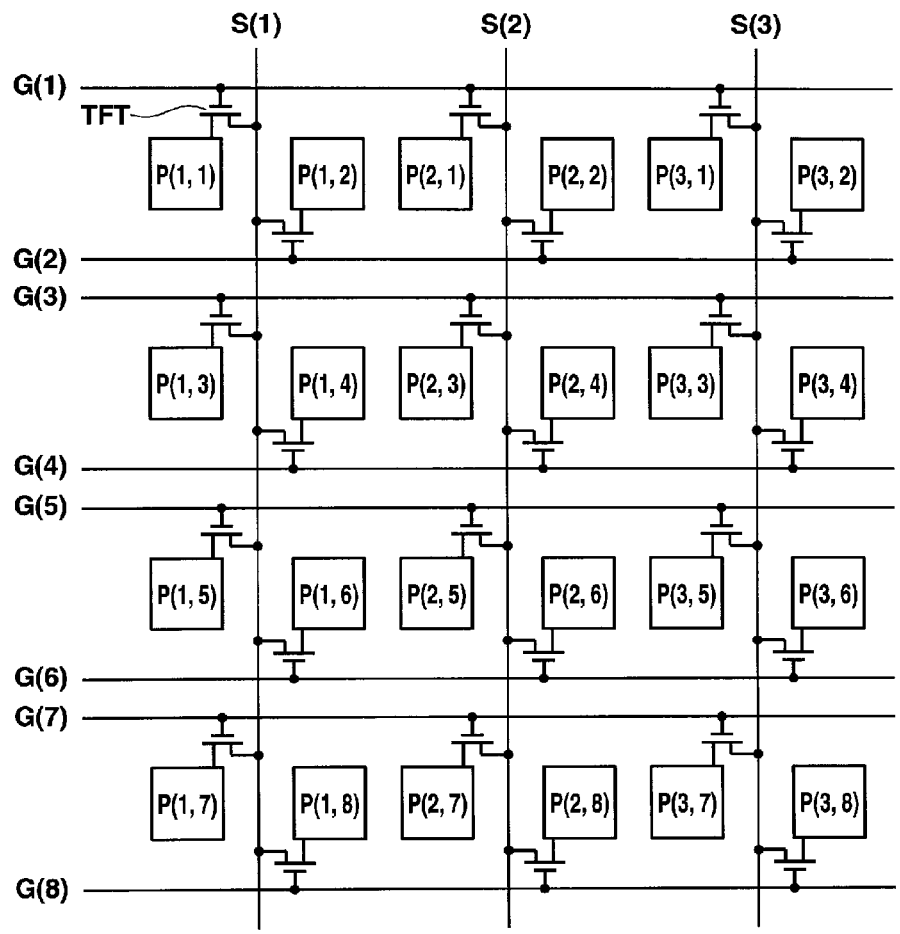
FIG. 18 is a figure showing a pixel arrangement in the conventional art.
Figure 19:
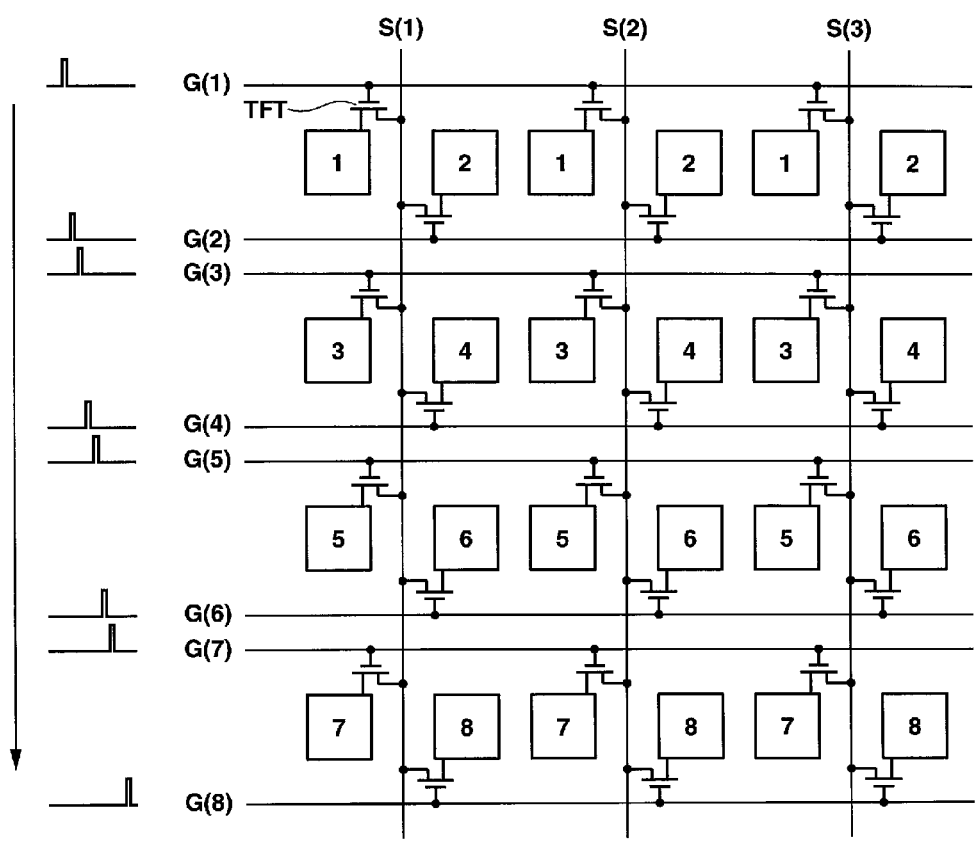
FIG. 19 is an explanatory diagram for a selection sequence of the respective scanning lines in the conventional art.
Figure 20:
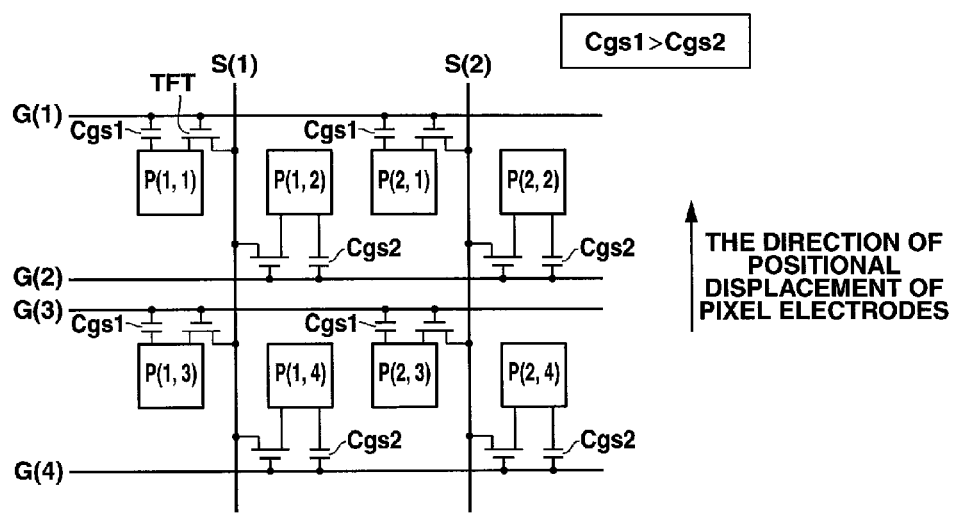
FIG. 20 is an explanatory diagram for parasitic capacitances of each pixel in the conventional art.

Furthermore, the above-described exemplary embodiments describe a case of frame inversion drive in which the voltage polarity written to the liquid crystal in one frame is the same among the pixels associated with each scanning line. However, as shown in FIG. 17A and FIG. 17B, the present invention and various embodiments thereof can be readily applied to the line inversion drive or the dot inversion drive, in which the voltage polarity written to the liquid crystal in one frame is different among the pixels that are associated with the adjacent scanning lines.

Further, in the above-described exemplary embodiment, a case of stripe arrangement of pixels in which the pixels are arranged in stripe is described. However, the present invention and its various embodiments are applicable to a delta arrangement or other forms of pixel arrangement.

It will be apparent to those skilled in the art that various modifications and variations can be made in the method and apparatus of the present invention without departing from the spirit or scope of the invention. Thus, it is intended that the present invention cover modifications and variations that come within the scope of the appended claims and their equivalents.

What is claimed is:

1. A liquid crystal display apparatus, comprising a liquid crystal display part and a driver circuit part,
   wherein the liquid crystal display part includes:
   a set of a first scanning line, a second scanning line and a data line,
   a first pixel electrode connected to the data line via a first switching element controlled by the first scanning line;
   a second pixel electrode connected to the data line via a second switching element controlled by the second scanning line; and
   a common electrode to apply voltages to liquid crystal that is disposed over the first electrode and the second electrode, respectively,
   wherein the first scanning line and the second scanning line are disposed adjacent to each other, and the data line intersects with the first scanning line and the second scanning line,
   wherein the first pixel electrode and the second pixel electrode are disposed between the first scanning line and the second scanning line,
   wherein a parasitic capacitance between the first pixel electrode and the first scanning line that is determined by a positional relationship between the first pixel electrode and the first scanning line is larger than a parasitic capacitance between the second pixel electrode and the second scanning line that is determined by a positional relationship between the second pixel electrode and the second scanning line,
   wherein the first pixel electrode is written with a display signal voltage for the first pixel electrode during a first writing period in one frame period, and the second pixel electrode is written with a display signal voltage for the second pixel electrode during a second writing period that differs from the first writing period in the one frame period the display signal voltage being set to differing levels that differ from each other for respective continuous two frame periods for each gray scale level, defining a central voltage of display signal voltages as a center of said differing levels, and
   wherein the driver circuit part supplies common voltages that differ from each other to said common electrode in the first writing period and the second writing period, respectively, such that an absolute value of a voltage differential between the common voltage and said central voltage during the first writing period is greater than an absolute value of a voltage differential between the common voltage and said central voltage during the second writing period.

2. The liquid crystal display apparatus according to claim 1, wherein said voltage differential during the first writing period of the first pixel electrode is substantially equal to a pull-in voltage that occurs when said first switching element is turned off at an end of said first writing period of the first pixel electrode, and such that said voltage differential during the second writing period of the second pixel electrode is substantially equal to a pull-in voltage that occurs when said second switching element is turned off at an end of said second writing period of the second pixel electrode.

3. The liquid crystal display apparatus according to claim 1, wherein the first pixel electrode and the second pixel electrode are disposed adjacently to each other in an extending direction of the first scanning line and the second scanning line.

4. The liquid crystal display apparatus according to claim 1, wherein the first pixel electrode and the second pixel electrode are disposed adjacent to each other across said data line.

5. The liquid crystal display apparatus according to claim 1, wherein the driver circuit part includes a memory that stores information on a parasitic capacitance between the first pixel electrode and the first scanning line and information on a parasitic capacitance between the second pixel electrode and the second scanning line, and wherein the driver circuit part supplies the common voltage in accordance with said information on the parasitic capacitances information stored in the memory.

6. The liquid crystal display apparatus according to claim 1, wherein in the liquid crystal display part, a space between the first pixel electrode and the first scanning line is narrower than a space between the second pixel electrode and the second scanning line.

7. The liquid crystal display apparatus according to claim 1, further comprising an auxiliary capacitance electrode that is supplied with a same voltage as the common electrode.

8. A liquid crystal display apparatus, comprising: a plurality of scanning lines; a first group of pixel electrodes and a second group of pixel electrodes disposed between a first scanning line and a second scanning line that are adjacent to each other of the plurality of scanning lines, the first group of pixel electrodes and the first scanning line having a first parasitic capacitance therebetween, the first parasitic capacitance being determined by a positional relationship between the first group of pixel electrodes and the first scanning line, the second group of pixel electrodes and the second scanning line having a second parasitic capacitance therebetween, the second parasitic capacitance being determined by a positional relationship between the second group of pixel electrodes and the second scanning line;

a common electrode;

liquid crystal interposed between the common electrode and the first and second groups of pixel electrodes, respectively; and a driver circuit writing to the first group of pixel electrodes display signal voltages for the first group of pixel electrodes during a first writing period in one frame period, and writing to the second group of pixel electrodes display signal voltages for the second group of pixel electrodes during a second writing period that differs from the first writing period in the one frame period, the driver circuit determining a first common voltage in accordance with the first parasitic capacitance and supplying the first common voltage to the common electrode during the first writing period so as to substantially offset a voltage drop in the first group of pixel electrodes due to the first parasitic capacitance, the driver circuit determining a second common voltage in accordance with the second parasitic capacitance and supplying the second common voltage to the common electrode during the second writing period so as to substantially offset a voltage drop in the second group of pixel electrodes due to the second parasitic capacitance.

9. The liquid crystal display apparatus according to claim 8, further comprising a memory that stores information relating to said first and second parasitic capacitances, wherein said driver circuit determines the first and second common voltages in accordance with the information stored in the memory.

10. The liquid crystal display apparatus according to claim 8, further comprising a first scanning line and a second scanning line each extending in a lateral direction, wherein pixel electrodes in the first group and pixel electrodes in the second group are arranged alternately in one row extending in the lateral direction and are disposed between the first and second scanning lines, and wherein each pair of adjacent pixel electrodes, one belonging to the first plurality and another belonging to the second plurality, shares a single data line.

11. The liquid crystal display apparatus according to claim 8, wherein the first parasitic capacitance differs from the second parasitic capacitance, and the first common voltage differs from the second common voltage.

12. The liquid crystal display apparatus according to claim 8, wherein the first parasitic capacitance is equal to the second parasitic capacitance, and the first common voltage is equal to the second common voltage.

13. A method for manufacturing a liquid crystal display apparatus, comprising:

preparing a liquid crystal device that includes:

a plurality of scanning lines, a first group of pixel electrodes and a second group of pixel electrodes disposed between a first scanning line and a second scanning line that are adjacent to each other of the plurality of scanning lines, the first group of pixel electrodes and the first scanning line having a first parasitic capacitance therebetween, the first parasitic capacitance being determined by a positional relationship between the first group of pixel electrodes and the first scanning line, the second group of pixel electrodes and the second scanning line having a second parasitic capacitance therebetween, the second parasitic capacitance being determined by a positional relationship between the second group of pixel electrodes and the second scanning line, a common electrode, liquid crystal interposed between the common electrode and the first and second groups of pixel electrodes, respectively, a driver circuit that supplies a common voltage to the common electrode, and a memory for storing information relating to said first and second parasitic capacitances;

acquiring information relating to said first and second parasitic capacitances;

storing the information relating to said first and second parasitic capacitances in said memory; and programming said driver circuit such that, based on the information stored in said memory, the driver circuit determines a first common voltage in accordance with the first parasitic capacitance, writes display signal voltages for the first group of pixel electrodes to the first group of pixel electrodes, and supplies the first common voltage to the common electrode during a first writing period in one frame period so as to substantially offset a voltage drop in the first group of pixel electrodes due to the first parasitic capacitance, and such that, based on the information stored in said memory, the driver circuit determines a second common voltage in accordance with the second parasitic capacitance, writes display signal voltages for the second group of pixel electrodes to the second group of pixel electrodes, and supplies the second common voltage to the common electrode during a second writing period that differs from the first writing period in the one frame period so as to substantially offset a voltage drop in the second group of pixel electrodes due to the second parasitic capacitance.

14. The method according to claim 13, wherein the first scanning line and the second scanning line each extends in a lateral direction, and pixel electrodes in the first group and pixel electrodes in the second group are arranged alternately in one row extending in the lateral direction and are disposed between the first and second scanning lines, and wherein each pair of adjacent pixel electrodes, one belonging to the first plurality and another belonging to the second plurality, shares a single data line.

15. The method according to claim 13, wherein the first parasitic capacitance differs from the second parasitic capacitance, and the first common voltage differs from the second common voltage.

16. The method according to claim 13, wherein the first parasitic capacitance is equal to the second parasitic capacitance, and the first common voltage is equal to the second common voltage.

17. The method according to claim 13, wherein the step of acquiring information relating to said first and second parasitic capacitances includes at least one of observing a display quality while changing levels of the first and second common voltages, observing a positional displacement of the first and second groups pixel electrodes relative to scanning lines, and calculating amounts of said respective voltage drops due to the first and second parasitic capacitances by empirical or theoretical equations.

* * * * *